United States Patent
Yamashita

(10) Patent No.: US 10,536,343 B2
(45) Date of Patent: Jan. 14, 2020

(54) TRAFFIC MANAGEMENT APPARATUS AND TRAFFIC MANAGEMENT METHOD

(71) Applicant: FUJITSU LIMITED, Kawasaki-shi, Kanagawa (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/971,012

(22) Filed: May 4, 2018

(65) Prior Publication Data

US 2018/0337832 A1    Nov. 22, 2018

(30) Foreign Application Priority Data

May 16, 2017    (JP) ................................ 2017-096983

(51) Int. Cl.
*H04L 12/24*    (2006.01)
*H04L 12/26*    (2006.01)

(52) U.S. Cl.
CPC .......... *H04L 41/145* (2013.01); *H04L 41/147* (2013.01); *H04L 43/045* (2013.01); *H04L 43/062* (2013.01)

(58) Field of Classification Search
None
See application file for complete search history.

(56) References Cited

U.S. PATENT DOCUMENTS

| | | | |
|---|---|---|---|
| 7,684,965 B2 * | 3/2010 | Sekine .................. | G05B 15/02 703/2 |
| 8,089,939 B1 * | 1/2012 | Mater .................. | H04W 36/30 370/332 |
| 2002/0171889 A1 * | 11/2002 | Takeuchi ............ | H04B 10/077 398/34 |
| 2008/0250497 A1 | 10/2008 | Mullarkey et al. | |

FOREIGN PATENT DOCUMENTS

| | | |
|---|---|---|
| JP | 2010-531553 | 9/2010 |
| JP | 2011-244098 | 12/2011 |
| JP | 2013-150083 | 8/2013 |
| JP | 2015-207795 | 11/2015 |
| JP | 2016-208169 | 12/2016 |

* cited by examiner

*Primary Examiner* — Angel T Brockman
(74) *Attorney, Agent, or Firm* — Fujitsu Patent Center

(57) ABSTRACT

There is provided a traffic management apparatus including a memory, and a processor coupled to the memory and the processor configured to select a base model based on history information stored in the memory so as to generate a traffic model, obtain a predicted value of the traffic according to the traffic model, and detect traffic abnormality based on the predicted value and an actual measurement value of the traffic.

7 Claims, 19 Drawing Sheets

FIG. 3 f1 FLOW TABLE

| FLOW NUMBER | FLOW IDENTIFIER | ACTION | STATISTICAL INFORMATION | ABNORMALITY LEVEL |
|---|---|---|---|---|
| fw1 | Dst IP = 10.1.1.1 | Output=p2 | 200byte | 10 |
| fw2 | Dst IP = 10.2.2.2 | Output=p3 | 500byte | 100 (ABNORMAL) |
| fw3 | Dst IP = 10.3.3.3 | Output=p4 | 1200byte | 5 |

FIG.12
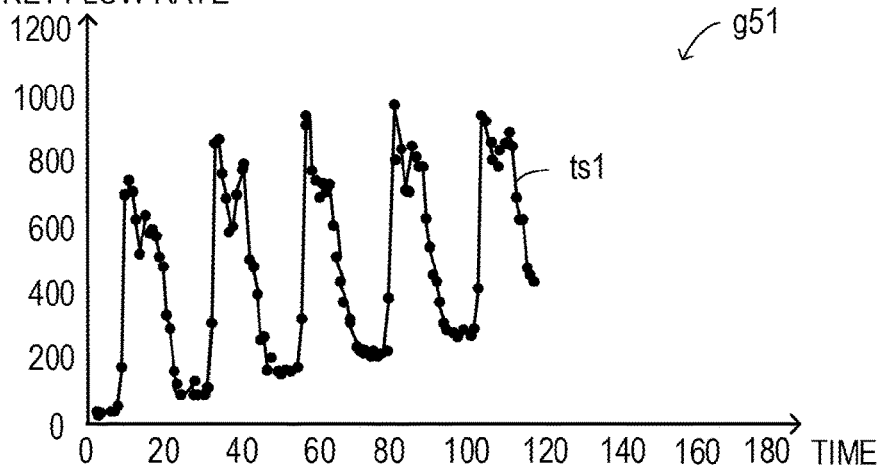
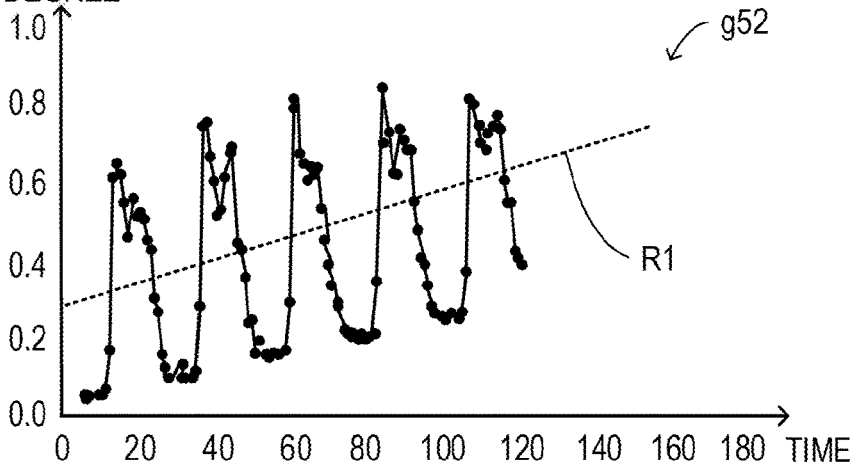
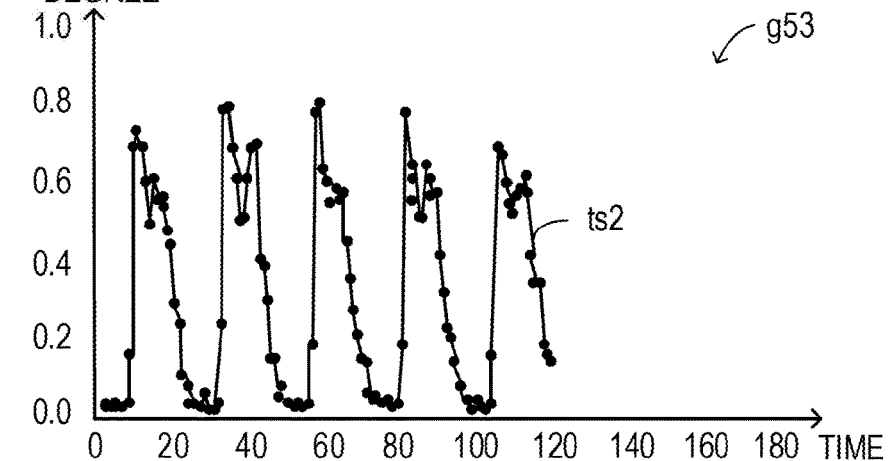

FIG.13
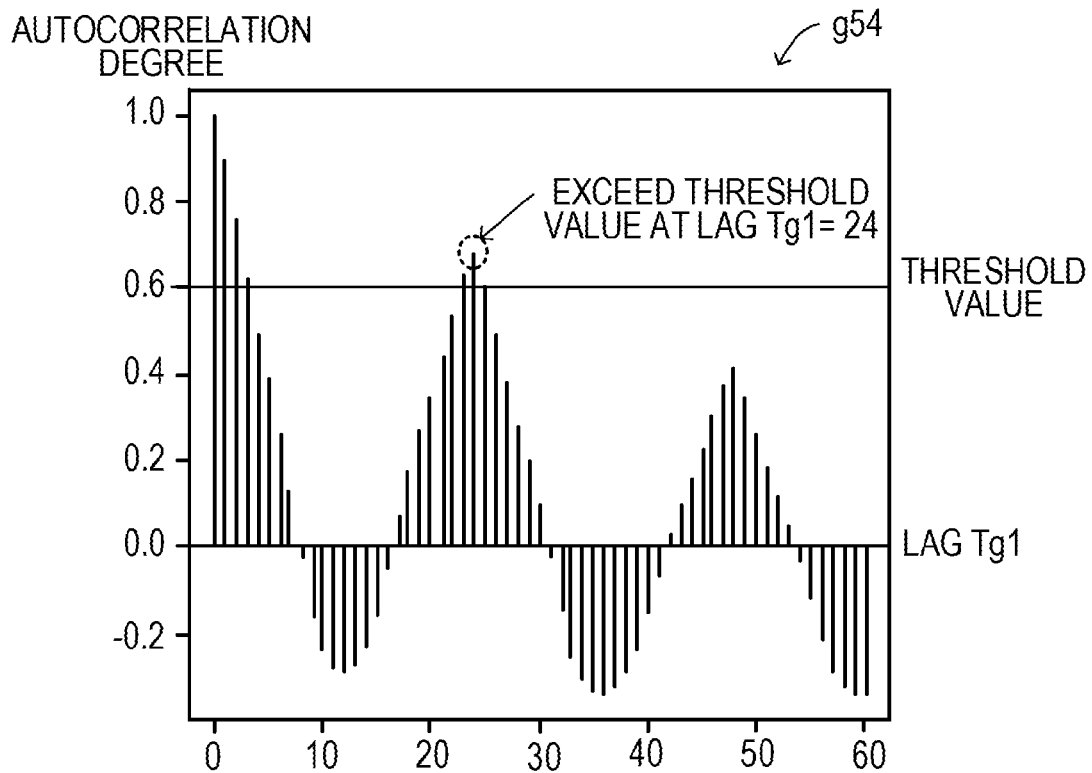
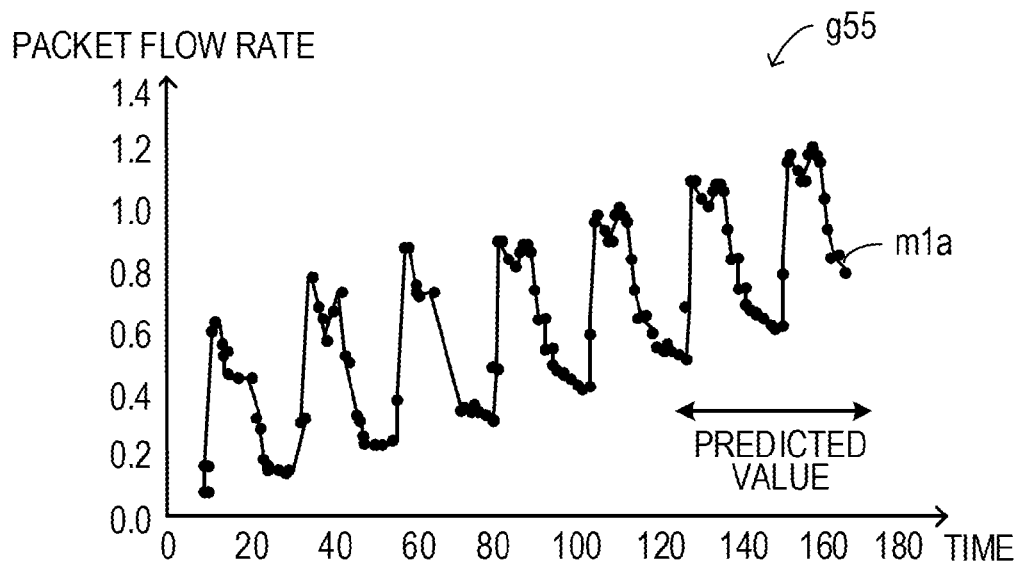

FIG.15
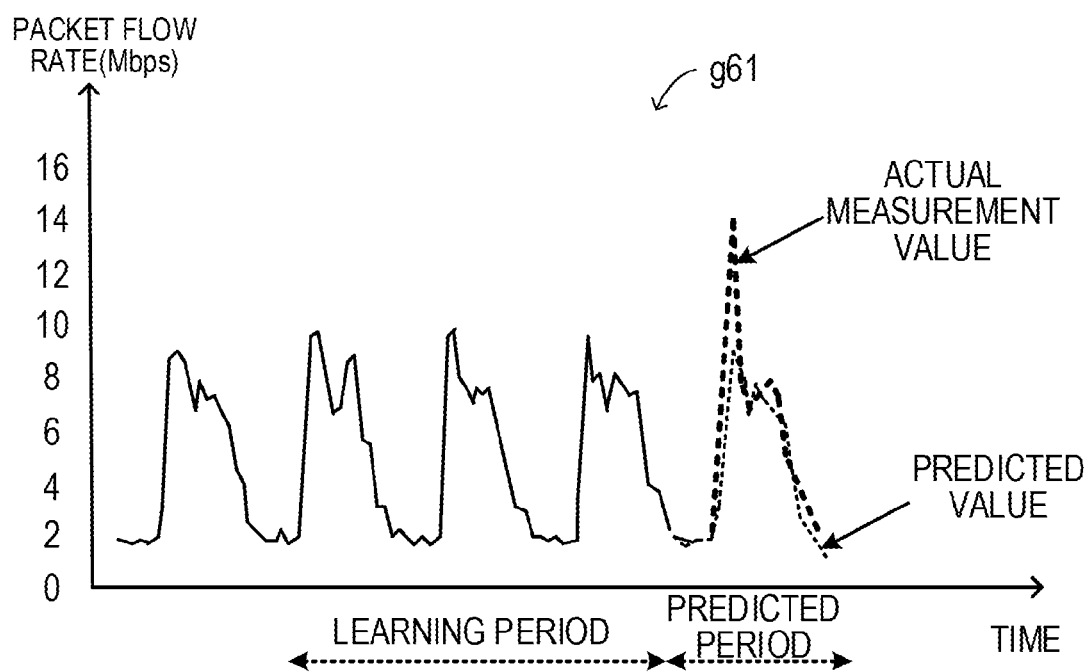
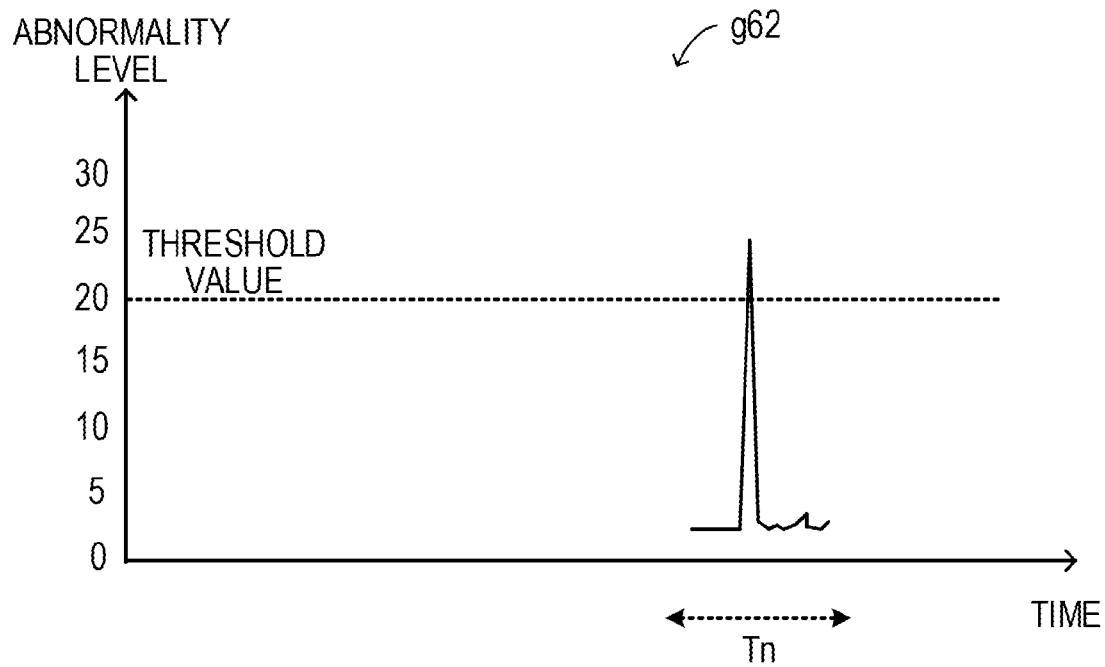

FIG.16
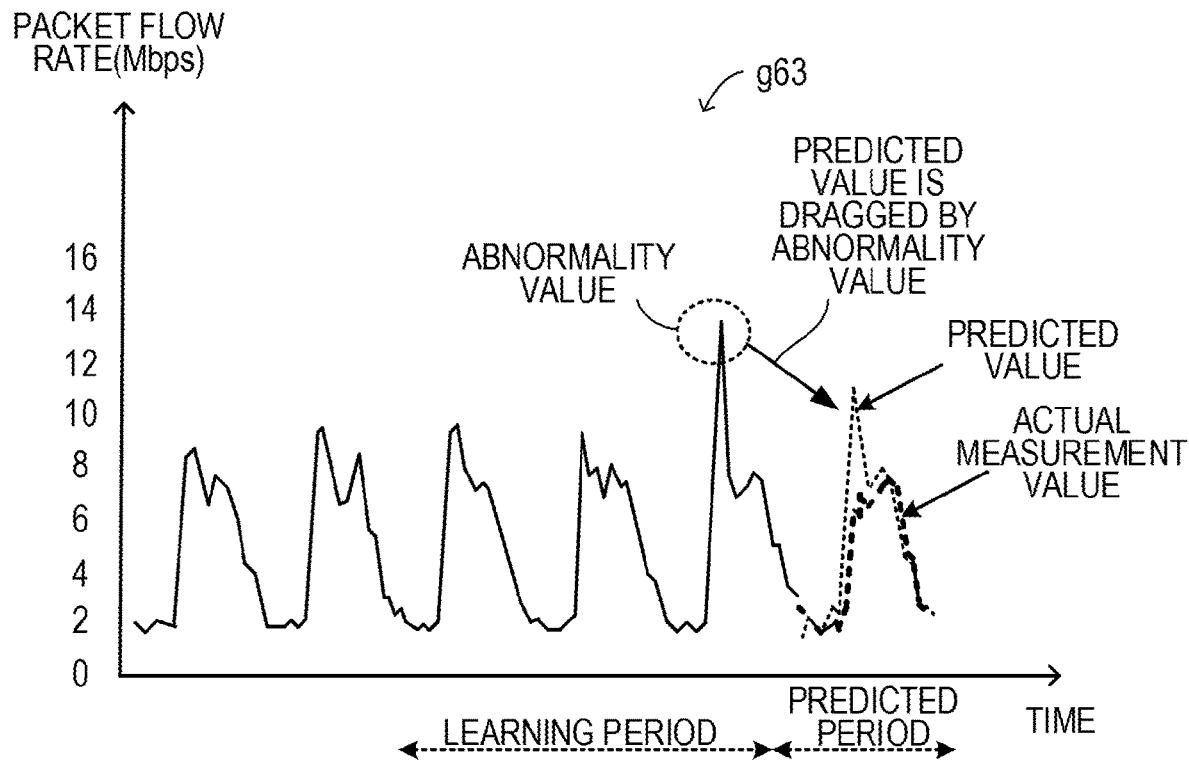
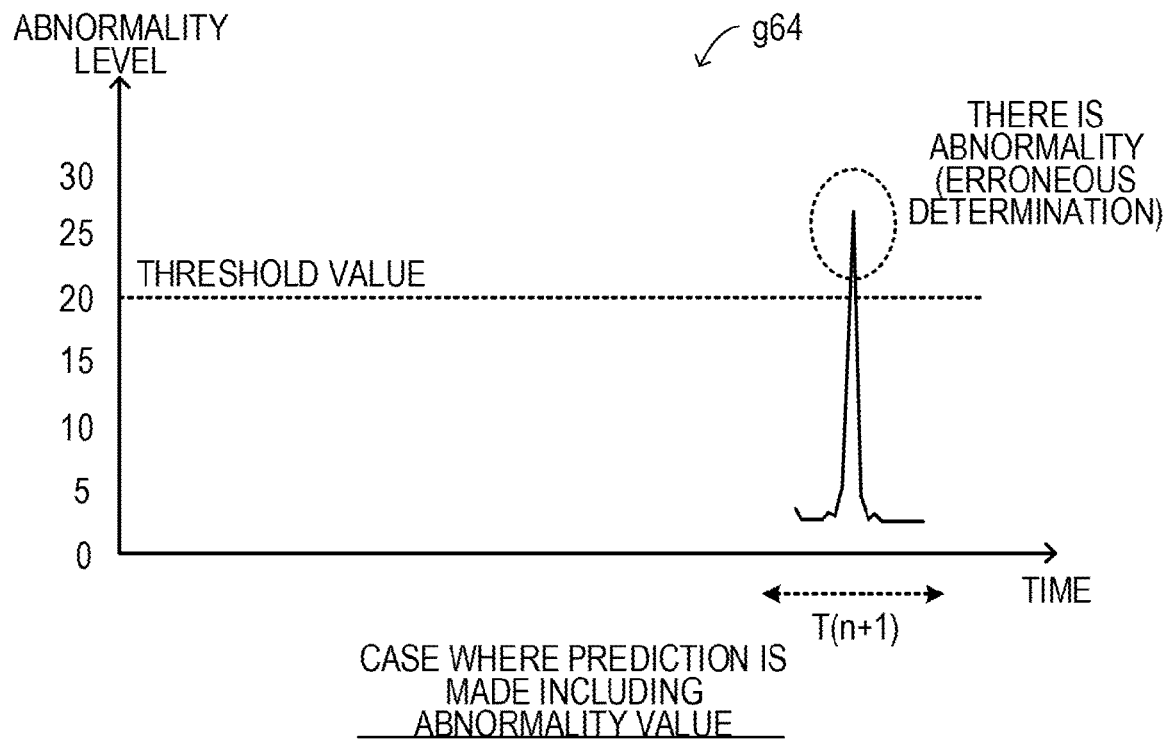

FIG.17
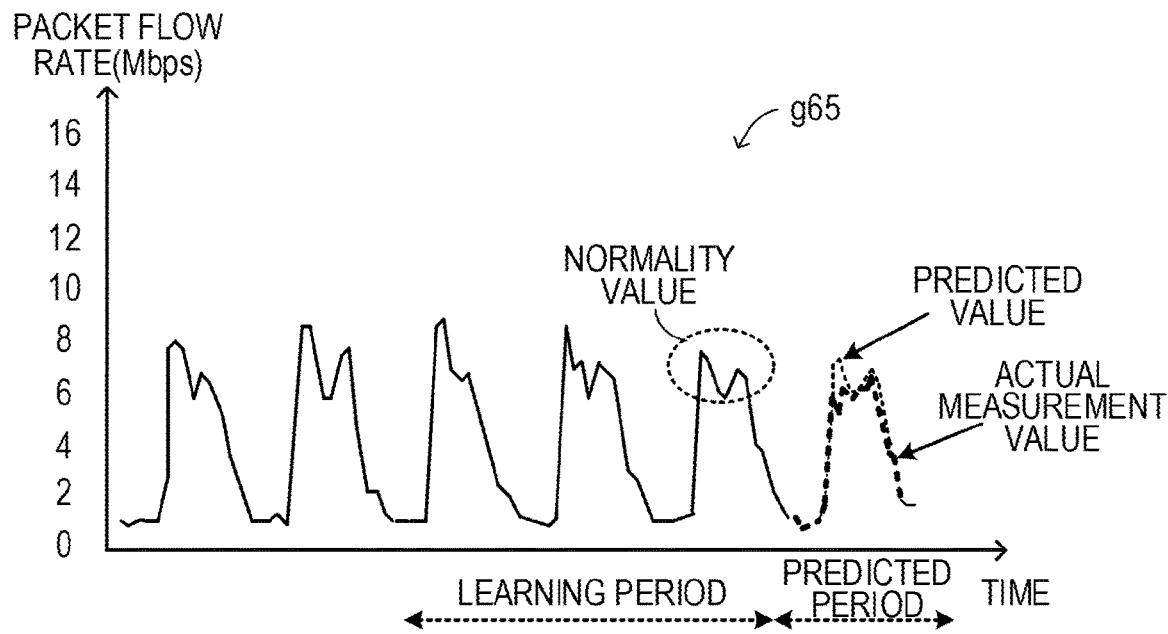
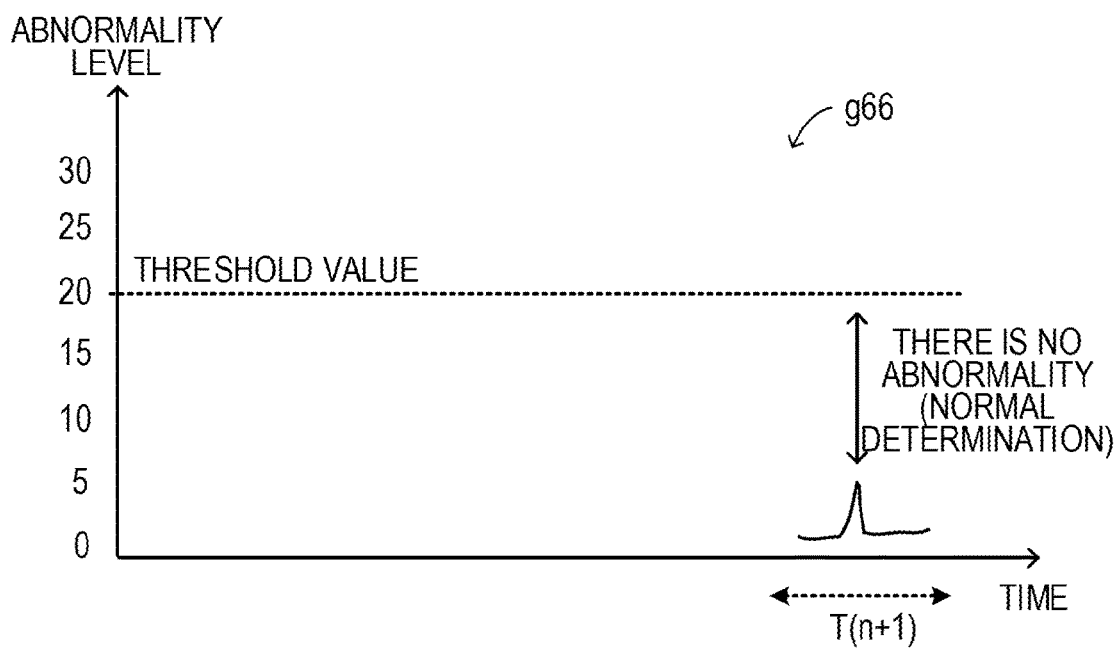
CASE WHERE PREDICTION IS MADE REMOVING ABNORMALITY VALUE

TRAFFIC MANAGEMENT APPARATUS AND TRAFFIC MANAGEMENT METHOD

CROSS-REFERENCE TO RELATED APPLICATION

This application is based upon and claims the benefit of priority of the prior Japanese Patent Application No. 2017-096983, filed on May 16, 2017, the entire contents of which are incorporated herein by reference.

FIELD

The embodiments discussed herein are related to a traffic management apparatus and a traffic management method.

BACKGROUND

In recent years, with the spread of virtual networks or Internet of things (IoT), network traffic has been increasing steadily. In order to grasp whether a managed network is operating properly, a network operator periodically collects traffic information, and when any abnormality (e.g., sudden increase or sudden decrease in traffic) occurs, the network operator is required to quickly detect the abnormality.

Related techniques are disclosed in, for example, Japanese Laid-Open Patent Publication Nos. 2013-150083 and 2011-244098.

SUMMARY

According to an aspect of the invention, a traffic management apparatus includes a memory, and a processor coupled to the memory and the processor configured to select a base model based on history information stored in the memory so as to generate a traffic model, obtain a predicted value of the traffic according to the traffic model, and detect traffic abnormality based on the predicted value and an actual measurement value of the traffic.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a configuration of a flow table;

FIG. 12 is a diagram for describing the operation of the traffic learning unit by a specific example;

FIG. 13 is a diagram for describing the operation of the traffic learning unit by a specific example;

FIG. 15 is a diagram for describing an example in which abnormality level detection accuracy is enhanced by the traffic model update control;

FIG. 16 is a diagram for describing the example in which the abnormality level detection accuracy is enhanced by the traffic model update control;

FIG. 17 is a diagram for describing the example in which the abnormality level detection accuracy is enhanced by the traffic model update control;

DESCRIPTION OF EMBODIMENTS

Currently used traffic monitoring technology compares a traffic flow rate with a fixed threshold value and detects that there is an abnormality when the traffic flow rate exceeds the threshold value. However, errors are often detected in the traffic abnormality detection performed based on the fixed threshold value.

For example, there is a possibility that a case where a traffic flow rate is increased by, for example, a software update or an increase in the number of line subscribers may be determined to be abnormal. Further, even when there is no abnormality in the traffic flow rate, there is a possibility that an abnormal traffic such as the case where a fluctuation cycle of the traffic is short is erroneously determined to be normal.

Hereinafter, an embodiment of technology that is capable of increasing the detection precision of the traffic abnormality will be described with reference to the accompanying drawings.

First Embodiment

Figure 1:
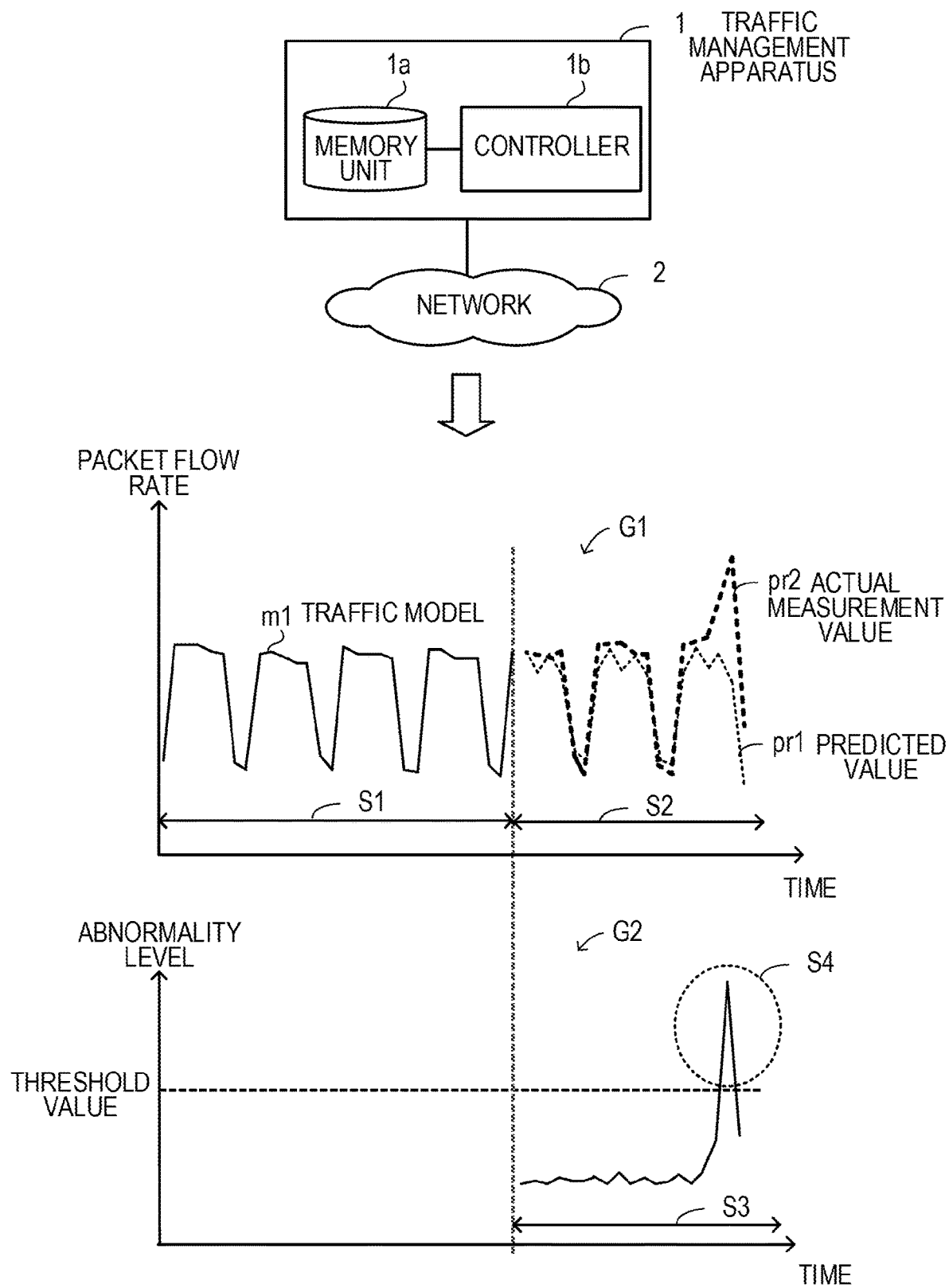
FIG. 1 is a diagram illustrating an example of a configuration of a traffic management apparatus.

A traffic management apparatus according to the first embodiment will be described with reference to FIG. 1. FIG. 1 is a diagram illustrating an example of a configuration of a traffic management apparatus. The traffic management apparatus 1 includes a memory unit 1a and a controller 1b, and performs a management control of traffic which flows on a network 2.

The memory unit 1a stores traffic history information (hereinafter, referred to as traffic information). The controller 1b selects a base model (time-series model) based on the traffic information to generate a traffic model. In addition, the controller 1b obtains a predicted value of the traffic from the traffic model and detects traffic abnormality based on the predicted value and an actual measurement value of the traffic.

An operation of the controller 1b will be described using the example illustrated in FIG. 1. The horizontal axes of graphs g1 and g2 indicate time. The vertical axis of the graph g1 indicates a package flow rate, and the vertical axis of the graph g2 indicates an abnormality level.

[Operation S1] The controller 1b selects the time-series model based on the traffic information stored in the memory unit 1a to generate a traffic model m1.

[Operation S2] The controller 1b obtains a predicted value pr1 of the traffic from the traffic model m1.

[Operation S3] The controller 1b detects traffic abnormality based on a difference (degree of divergence) between the predicted value pr1 of the traffic and the actual measurement value pr2 of the traffic.

[Operation S4] The controller 1b compares the calculated traffic abnormality value with a predetermined threshold value to perform an abnormality determination processing. When the traffic abnormality value exceeds the threshold value, the controller 1b determines that there is an abnormality.

As described above, the traffic management apparatus 1 selects a base model based on the traffic information to generate the traffic model and detects the traffic abnormality based on the predicted value obtained from the traffic model and the actual measurement value. As a result, the traffic management apparatus 1 is capable of increasing a detection precision of a traffic abnormality level.

Second Embodiment

Figure 2:
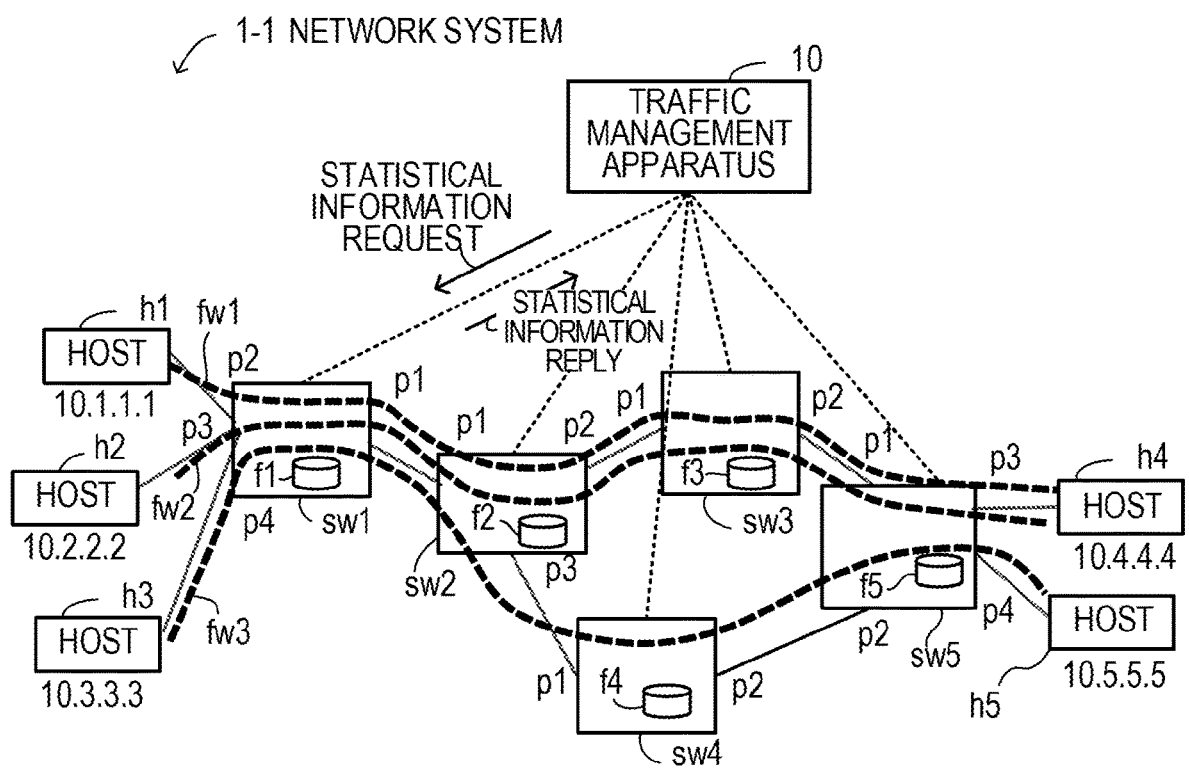
FIG. 2 is a diagram illustrating an example of a configuration of a network system.

Next, a second embodiment will be described. First, a network configuration will be described. FIG. 2 is a diagram illustrating an example of the configuration of a network system. A network system 1-1 includes hosts h1 to h5, switches (communication nodes) sw1 to sw5, and a traffic management apparatus 10. The switches sw1 to sw5 have flow tables f1 to f5, respectively.

The flow tables f1 to f5 are tables in which statistical information (traffic information) based on a flow unit which is a traffic flow connecting the hosts is registered. The statistical information is, for example, a packet flow rate during a predetermined period.

As for a connection relationship between respective components, the host h1 (address: 10.1.1.1) is connected to an interface p2 of the switch sw1 and the host h2 (address: 10.2.2.2) is connected to an interface p3 of the switch sw1. The host h3 (address: 10.3.3.3) is connected to an interface p4 of the switch sw1.

The interface p1 of the switch sw1 and the interface p1 of the switch sw2 are connected to each other, and the interface p3 of the switch sw2 and the interface p1 of the switch sw4 are connected to each other.

The interface p2 of the switch sw2 and the interface p1 of the switch sw3 are connected to each other, and the interface p2 of the switch sw3 and the interface p1 of the switch sw5 are connected to each other. The interface p2 of the switch sw4 and the interface p2 of the switch sw5 are connected to each other.

The host h4 (address: 10.4.4.4) is connected to the interface p3 of the switch sw5, and the host h5 (address: 10.5.5.5) is connected to the interface p4 of the switch sw5.

Meanwhile, the host h1 and the host h4 communicate with each other by a flow fw1 passing through the switches sw1, sw2, sw3, and sw5. The host h2 and the host h4 communicate with each other by a flow fw2 passing through the switches sw1, sw2, sw3, and sw5. The host h3 and the host h5 communicate with each other by a flow fw3 passing through the switches sw1, sw2, sw4, and sw5.

The traffic management apparatus 10 is connected to at least one of the switches sw1 to sw5, transmitting a statistical information request to a predetermined switch, and receiving statistical information reply returned from the switch.

FIG. 3 is a diagram illustrating an example of the configuration of a flow table. The flow table f1 included in the switch sw1 will be described. The flow table f1 has fields for flow number, flow identifier, action, statistical information, and abnormality level as items (the flow tables of other switches have the same configuration). Further, the action is one of flow entries that describe processing of packets based on an Open Flow protocol.

In FIG. 3, for example, with respect to the flow fw2, the flow identifier is "Dst IP=10.2.2.2," the action is "Output=p3," the statistical information is "500 bytes," and the abnormality level is "100 (abnormal)." The abnormality level is determined by the traffic management apparatus 10, notified to a predetermined switch, and registered in the flow table in the switch which receives the notification.

In the above description, the traffic management apparatus 10 acquires the statistical information based on the flow table in the switch, but may acquire the statistical information through a management information base (MIB).

Hardware Configuration

Figure 4:
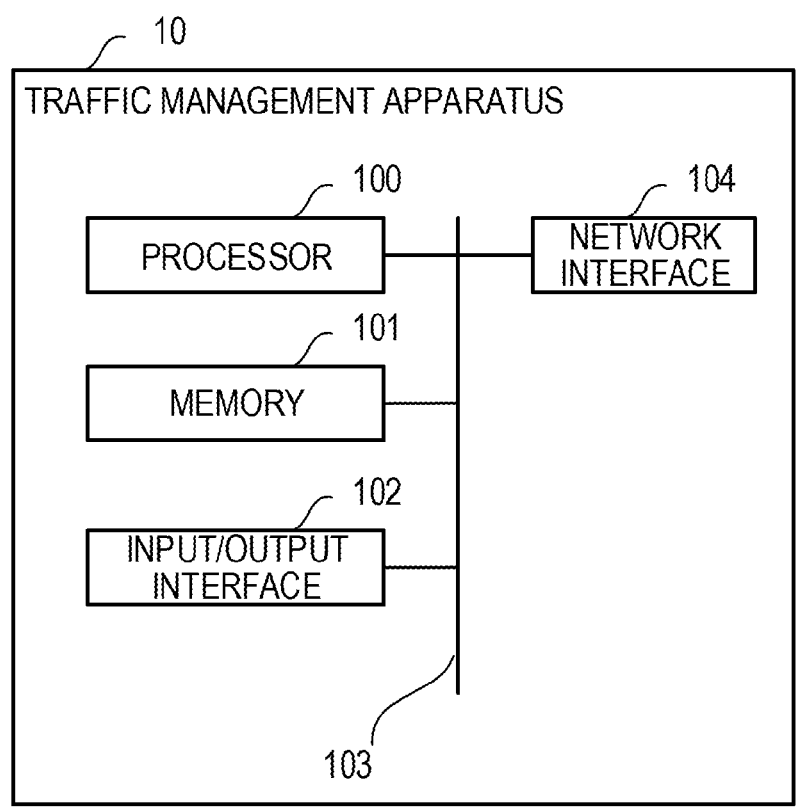
FIG. 4 is a diagram illustrating an example of a hardware configuration of the traffic management apparatus.

FIG. 4 is a diagram illustrating an example of a hardware configuration of the traffic management apparatus. The entire traffic management apparatus 10 is controlled by a processor 100. That is, the processor 100 serves as a controller of the traffic management apparatus 10.

A memory 101 and a plurality of peripheral devices are connected to the processor 100 via a bus 103. The processor 100 may be a multiprocessor. The processor 100 is, for example, a central processing unit (CPU), a micro processing unit (MPU), a digital signal processor (DSP), an application specific integrated circuit (ASIC), or a programmable logic device (PLD). Further, the processor 100 may be, for example, a combination of two or more of the CPU, the MPU, the DSP, the ASIC, and the PLD.

The memory 101 is used as a main memory device of the traffic management apparatus 10. The memory 101 temporarily stores at least a part of a program of an operating system (OS) or an application program executed in the processor 100. Further, the memory 101 stores various data required for the processing by the processor 100.

The memory 101 is also used as a sub memory device of the traffic management apparatus 10 and stores the program of the OS, the application program, and various data. The memory 101 may include a semiconductor memory device such as a flash memory or a solid state drive (SSD) or a magnetic recording medium such as a hard disk drive (HDD) as a sub memory device.

The peripheral device connected to the bus 103 includes an input/output interface 102 and a network interface 104. A monitor (e.g., a light emitting diode (LED) or a liquid crystal display (LCD)) which serves as a display device that displays a state of the traffic management apparatus 10 according to a command from the processor 100 is connected to the input/output interface 102.

The input/output interface 102 may be connected to an information input device such as a keyboard or a mouse to transmit a signal sent from the information input device to the processor 100. The input/output interface 102 also serves as a communication interface for connecting the peripheral device. For example, the input/output interface 102 may connect an optical drive device that reads data recorded on an optical disk using, for example, laser light. The optical disk is a portable recording medium on which data is recorded so as to be readable by reflection of light. The optical disk includes a digital versatile disc (DVD), a DVD-random access memory (DVD-RAM), a compact disc read only memory (CD-ROM), and a CD-recordable (R)/rewritable (RW).

The input/output interface 102 may connect a memory device and a memory reader/writer. The memory device is a recording medium having a communication function with the input/output interface 102. The memory reader/writer is a device that writes data to a memory card or reads the data from the memory card. The memory card is a card type recording medium.

The network interface 104 performs an interface processing for connecting to the switches described above with reference to FIG. 2 and other network devices. As for the network interface 104, for example, a network interface card (NIC) or a wireless local area network (LAN) card may be used. The data received by the network interface 104 is output to the memory 101 or the processor 100.

With the hardware configuration described above, a processing function of the traffic management apparatus 10 may be implemented. For example, in the traffic management apparatus 10, the processor 100 may execute a predetermined program to perform traffic management control of the present disclosure.

The traffic management apparatus 10 implements the processing function of the present disclosure by executing, for example, the program recorded on a computer readable recording medium. The program that describes processing contents executed by the traffic management apparatus 10 may be recorded in various recording media.

For example, the program that is executed by the traffic management apparatus 10 may be stored in the sub memory device. The processor 100 loads at least a part of the program in the sub memory device into the main memory device and executes the program.

The program may be recorded in the portable recording medium such as the optical disk, memory device, or memory card. The program stored in the portable recording medium may be executed after being installed in the sub memory device, for example, under the control of the processor 100. Further, the processor 100 may read and execute the program directly from the portable recording medium.

Functional Block

Figure 5:
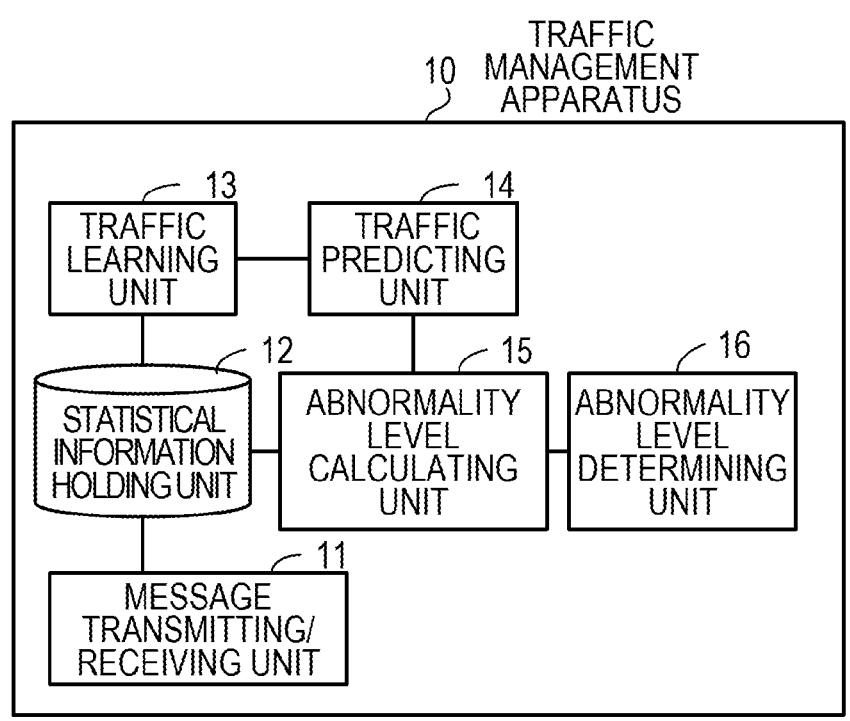
FIG. 5 is a diagram illustrating an example of a functional block of the traffic management apparatus.

FIG. 5 is a diagram illustrating an example of a functional block of the traffic management apparatus. The traffic management apparatus 10 learns the statistical information (traffic information), selects a time-series model according to traffic fluctuation, and generates a traffic model. In addition, the traffic management apparatus 10 acquires a predicted value from the traffic model, calculates the abnormality level from the difference between the predicted value and the actual measurement value, and performs the abnormality level determination by processing the threshold value.

The traffic management apparatus 10 includes a message transmitting/receiving unit 11, a statistical information holding unit 12, a traffic learning unit 13, a traffic predicting unit 14, an abnormality level calculating unit 15, and an abnormality level determining unit 16.

The message transmitting/receiving unit 11 is connected to the switch illustrated in FIG. 2, and performs a transmission of statistical information request and a reception of statistical information reply. The statistical information holding unit 12 holds the traffic information acquired from a predetermined switch in the network.

The traffic learning unit 13 automatically selects the time-series model in which the traffic fluctuation is modeled in time series from the traffic information accumulated by the statistical information holding unit 12. In addition, the traffic learning unit 13 sets a parameter value of the time-series model to generate the traffic model.

Examples of the traffic model include a traffic model based on auto regressive (AR), a traffic model based on auto regressive integrated moving average (ARIMA), and a traffic model based on a regressive line.

The traffic predicting unit 14 obtains a traffic predicted value using the traffic model generated by the traffic learning unit 13. The abnormality level calculating unit 15 compares the predicted value and the actual measurement value of the traffic and calculates the abnormality level from the difference between both values. When the calculated abnormality level exceeds a predetermined threshold value, the abnormality level determining unit 16 determines that there is an abnormality (when the calculated abnormality level does not exceed the predetermined threshold value, the abnormality level determining unit 16 determines that there is no abnormality (normal)).

The functions of the traffic learning unit 13, the traffic predicting unit 14, the abnormality level calculating unit 15, and the abnormality level determining unit 16 are executed by the processor 100 illustrated in FIG. 4. Further, the statistical information holding unit 12 corresponds to the memory 101 illustrated in FIG. 4, and the function of the message transmitting/receiving unit 11 is executed by the network interface 104. In addition, each component may be configured by a hardware circuit by, for example, a logical circuit.

The function of the memory unit 1a illustrated in FIG. 1 is implemented by the statistical information holding unit 12, and the function of the controller 1b illustrated in FIG. 1 is implemented by the traffic learning unit 13, the traffic predicting unit 14, the abnormality level calculating unit 15, and the abnormality level determining unit 16.

Determination Example of Abnormality Level

Figure 6:
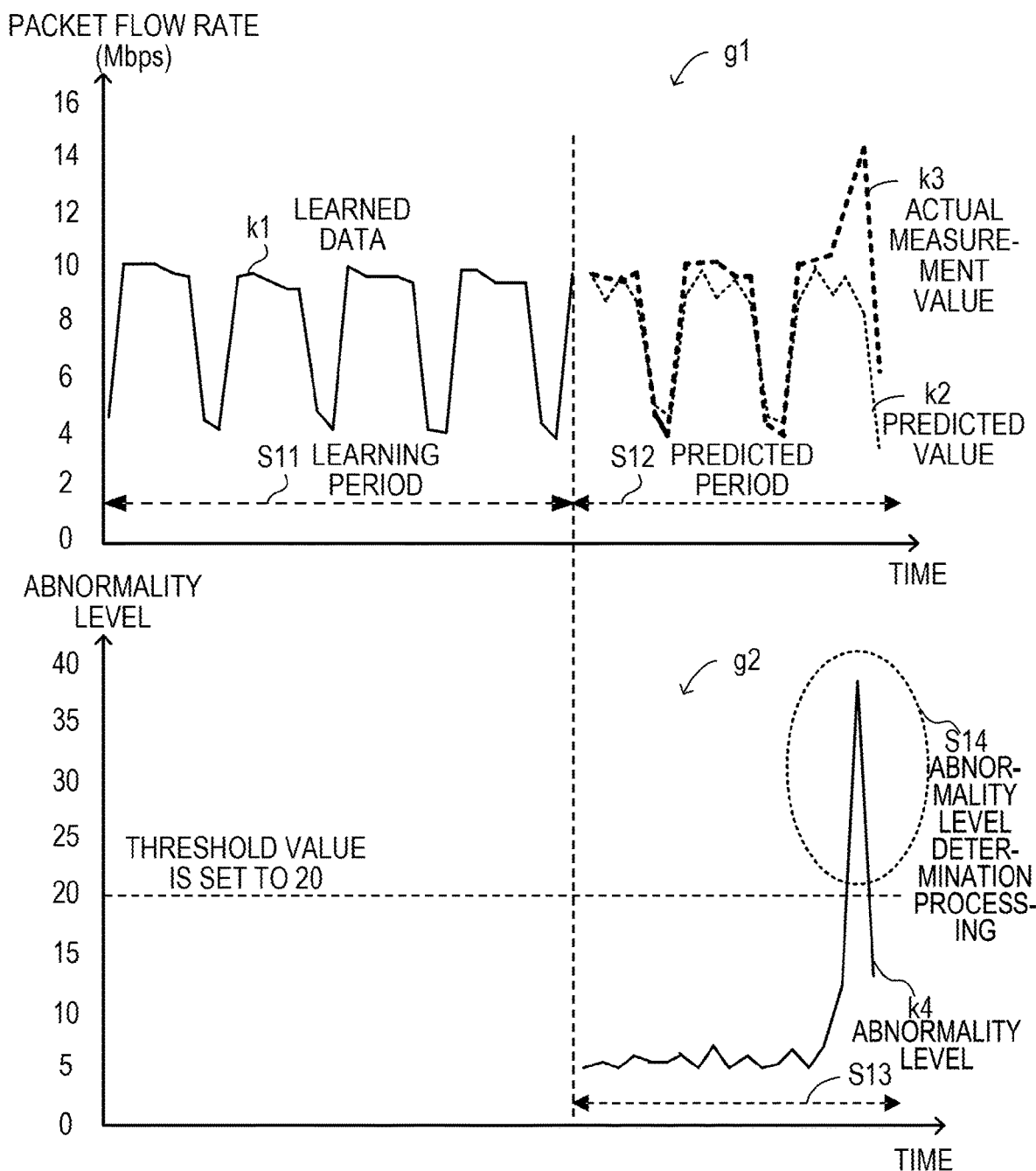
FIG. 6 is a diagram illustrating an example of an abnormality level determination in a case where a rapidly increasing traffic occurs.

Next, determination processing of the abnormality level will be described with reference to specific examples using FIGS. 6 to 10. First, as a determination example of the abnormality level, a case where rapidly increasing traffic occurs will be described. FIG. 6 is a diagram illustrating an example of an abnormality level determination in a case where rapidly increasing traffic occurs. The horizontal axes of the graphs g1 and g2 are the time. The vertical axis of the graph g1 indicates a packet flow rate (Mbps) and the vertical axis of the graph g2 indicates the abnormality level.

A waveform k1 indicates learned data of the traffic model, a waveform k2 indicates the predicted value of the traffic, a waveform k3 indicates the actual measurement value of the traffic, and a waveform k4 indicates the abnormality level.

[Operation S11] During a learning period of the traffic, the traffic learning unit 13 selects an AR model as the time-series model based on the traffic information accumulated by the statistical information holding unit 12 (the AR model is selected in data which is normal (has a constant average value and is periodic). In addition, the traffic learning unit 13 calculates an order and a coefficient of the AR model to generate the traffic model (waveform k1) by the AR.

When the traffic model by the AR is set to x(t), xt may be represented as $x(t)=\beta_1(t-1)+\beta_2(t-2)+ \ldots +\beta_n(t-n)$. For example, when the order of the AR model is 7, the traffic learning unit 13 obtains $x(t)=\beta_1(t-1)+\beta_2(t-2)+\ldots+\beta_7(t-7)$. Further, the traffic learning unit 13 calculates, for example, $\beta_1=-0.025$, $\beta_2=-0.35$, ..., $\beta_7=0.40$ with respect to the coefficient.

[Operation S12] During a predicted period of the traffic, the traffic predicting unit 14 obtains the traffic predicted value (waveform k2) at a predetermined time (predetermined sampling point) from the traffic model based on the AR generated by the traffic learning unit 13.

In the case of obtaining the predicted value, for example, the traffic model generated during the learning period is regarded to form a traffic amount during a predetermined period in the future and is adaptively modified based on fluctuation of a predictable traffic amount during the predetermined period. In addition, the traffic amount sampled at a predetermined time is set as the predicted value with respect to a modified model.

[Operation S13] The abnormality level calculating unit 15 calculates the abnormality level based on the predicted value (waveform k2) of the traffic and the actual measurement value (waveform k3) of the traffic accumulated by the statistical information holding unit 12 during the predicted period. For example, the abnormality level is calculated in Equation (1) defined as below.

$$\text{Abnormality level}=((\text{actual measurement value})-(\text{predicted value}))^2 \quad (1)$$

Alternatively, the abnormality level calculating unit 15 may calculate the abnormality level by using Equation (2) below.

$$\text{Abnormality level}=((\text{actual measurement value})-(\text{predicted value})/(\text{predicted value}))^2 \quad (2)$$

[Operation S14] The abnormality level determining unit 16 compares the calculated abnormality level with the threshold value and determines that there is an abnormality when the abnormality level exceeds the threshold value. For example, when the threshold value is set to 20, since the calculated abnormality level exceeds the threshold value, it is determined that there is an abnormality in the example of FIG. 6.

Next, as the determination example of the abnormality level, a case where traffic having different cycles (having a rapidly changed cycle) occurs will be described. In the case where the traffic having different cycles occurs, as abnormal traffic, for example, there is flapping of a route in which a traffic fluctuation cycle becomes short. The route flapping is a phenomenon that a load such as route selection processing in a router increases to obstruct packet transfer.

Figure 7:
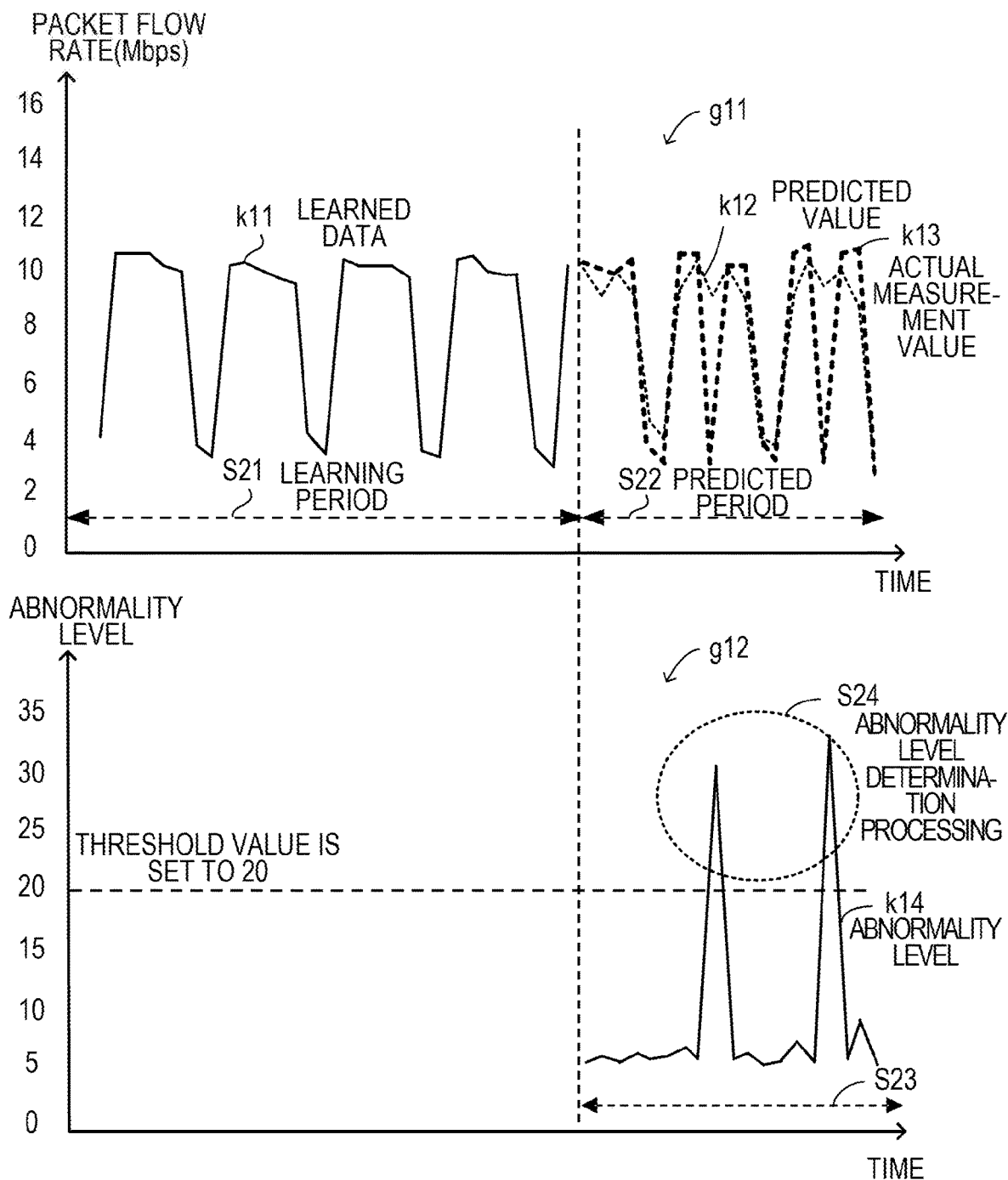
FIG. 7 is a diagram illustrating an example of an abnormality level determination in a case where traffic having different cycles occurs.

FIG. 7 is a diagram illustrating an example of an abnormality level determination in a case where traffic having different cycles occurs. The horizontal axes of graphs g11 and g12 are the time. The vertical axis of the graph g11 indicates the packet flow rate (Mbps) and the vertical axis of the graph g12 indicates the abnormality level. Further, a waveform k11 is the learned data of the traffic model, a waveform k12 is the predicted value of the traffic, a waveform k13 is the actual measurement value of the traffic, and a waveform k14 is the abnormality level.

[Operation S21] During the learning period of the traffic, the traffic learning unit 13 selects the AR model as the time-series model based on the traffic information accumulated by the statistical information holding unit 12 and generates the traffic model by the AR of the waveform k11.

[Operation S22] During a predicted period of the traffic, the traffic predicting unit 14 obtains the traffic predicted value (waveform k12) from the traffic model based on the AR generated by the traffic learning unit 13.

[Operation S23] The abnormality level calculating unit 15 calculates the abnormality level by Equation (1) or (2) described above based on the predicted value (waveform k12) of the traffic and the actual measurement value (waveform k13) of the traffic accumulated by the statistical information holding unit 12 during the predicted period.

[Operation S24] The abnormality level determining unit 16 compares the calculated abnormality level with the threshold value and determines that there is an abnormality when the abnormality level exceeds the threshold value. In the example of FIG. 7, since the calculated abnormality level exceeds a predetermined threshold value (e.g., 20), it is determined that there is an abnormality.

In the case where the traffic having different cycles occurs as described above, in the example of FIG. 7, since the fluctuation cycle is out of a predicted fluctuation cycle (e.g., when the route flapping occurs and the fluctuation cycle is thus out of the predicted fluctuation cycle), it is determined that there is an abnormality.

Figure 8:
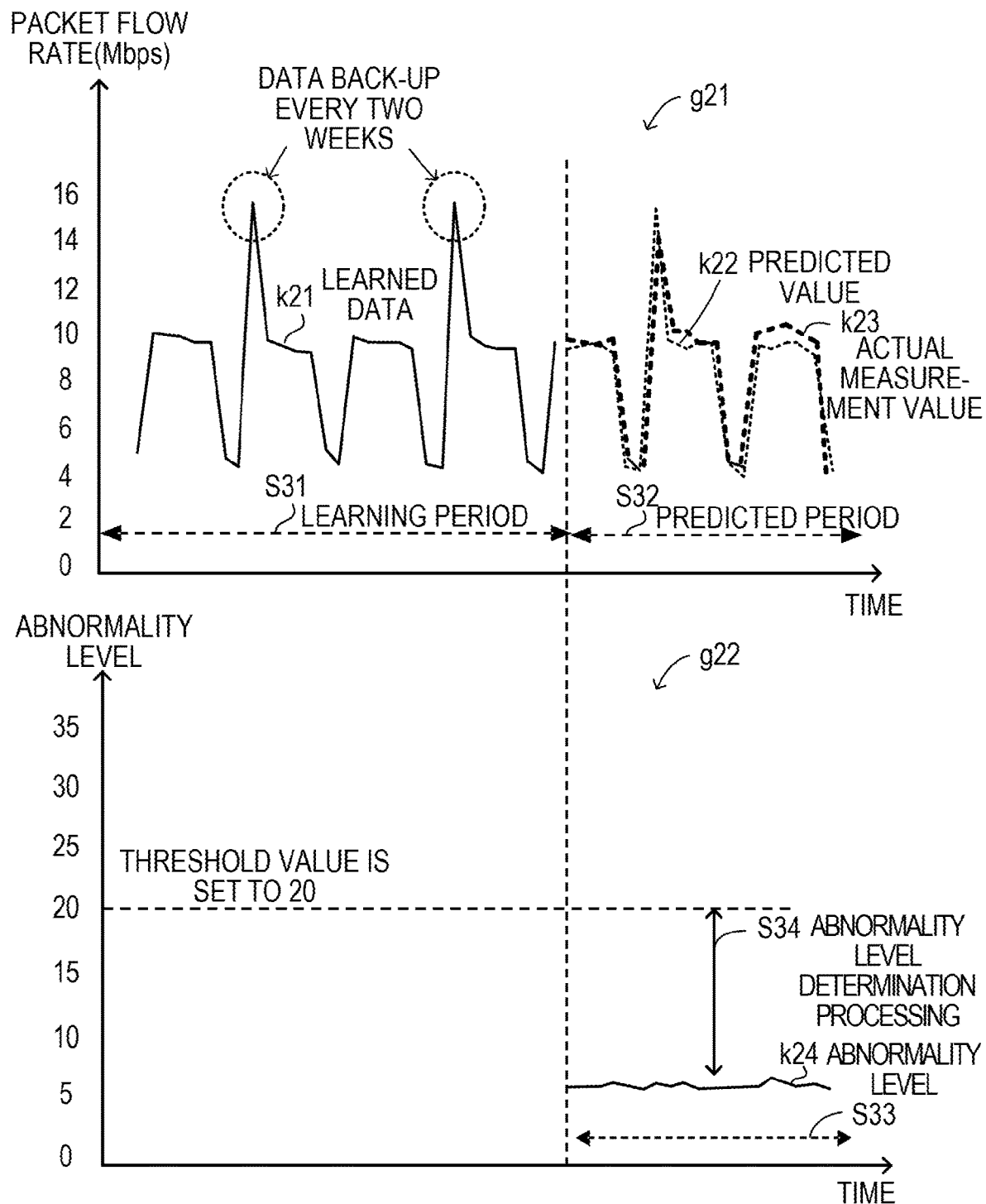
FIG. 8 is a diagram illustrating an example of an abnormality level determination in a case where the rapidly increasing traffic periodically occurs.

First, as the determination example of the abnormality level, a case where the rapidly increasing traffic periodically occurs will be described. FIG. 8 is a diagram illustrating an example of an abnormality level determination in a case where the rapidly increasing traffic periodically occurs. For example, it is assumed that data is backed up every two weeks and traffic increases rapidly (the time of one mountain-like waveform in the figure is one week).

The horizontal axes of graphs g21 and g22 are the time. The vertical axis of the graph g21 indicates the packet flow rate (Mbps) and the vertical axis of the graph g22 indicates the abnormality level. Further, a waveform k21 is the learned data of the traffic model, a waveform k22 is the predicted value of the traffic, a waveform k23 is the actual measurement value of the traffic, and a waveform k24 is the abnormality level.

[Operation S31] During the learning period of the traffic, the traffic learning unit 13 selects an ARIMA model as the time-series model based on the traffic information accumulated by the statistical information holding unit 12 (the ARIMA model is selected in the data which is abnormal (has an inconstant average value and is also periodic). In addition, the traffic learning unit 13 calculates the order and the coefficient of the ARIMA model to generate the traffic model (waveform k21) by the ARIMA.

[Operation S32] During a predicted period of the traffic, the traffic predicting unit 14 obtains the traffic predicted value (waveform k22) from the traffic model based on the ARIMA generated by the traffic learning unit 13.

[Operation S33] The abnormality level calculating unit 15 calculates the abnormality level by Equation (1) or (2) described above based on the predicted value (waveform k22) of the traffic and the actual measurement value (waveform k23) of the traffic accumulated by the statistical information holding unit 12 during the predicted period.

[Operation S34] The abnormality level determining unit 16 compares the calculated abnormality level with the threshold value and determines that there is an abnormality when the abnormality level exceeds the threshold value. In the example of FIG. 8, since the calculated abnormality level does not exceed a predetermined threshold value (for example, 20), it is determined that there is no abnormality.

In the case where a rapidly increasing traffic occurs periodically as described above, as in the example of FIG. 8, it is determined that there is no abnormality with regard to the predictable rapid increased traffic such as traffic that carries out data backup between sites every two weeks.

Next, as a determination example of the abnormality level, a case where traffic of a predetermined cycle, as traffic including a cycle component and a trend component is small, will be described. Further, the trend component is a predetermined trend which data shows during a predetermined period, such as a constant increase trend or decrease trend.

Figure 9:
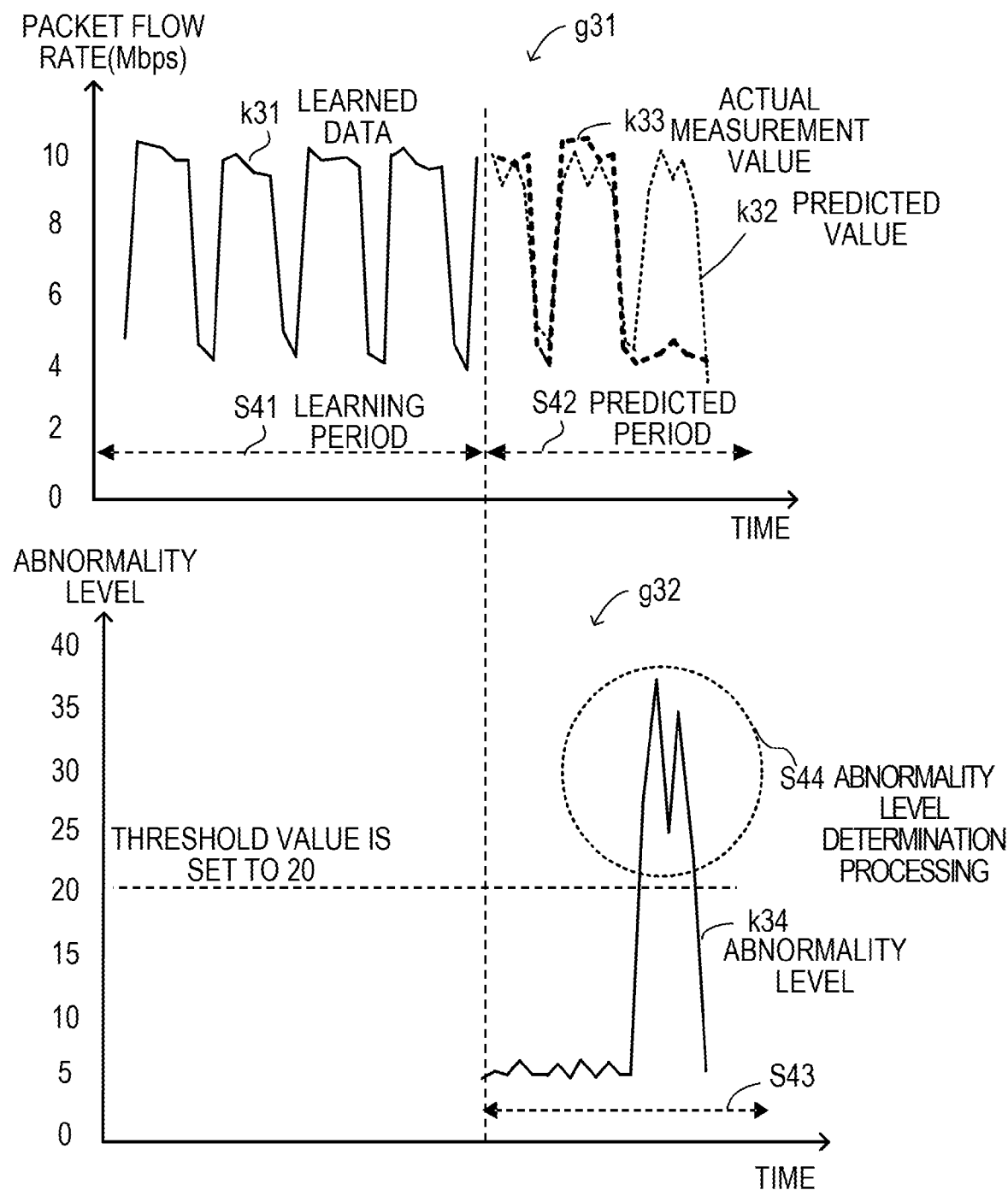
FIG. 9 is a diagram illustrating an example of an abnormality level determination in a case where an amount of traffic of a certain cycle is small for traffic including a cyclic component and a trend component.

FIG. 9 is a diagram illustrating an example of an abnormality level determination in a case where an amount of traffic of a certain cycle is small for traffic including a cyclic component and a trend component. The horizontal axes of graphs g31 and g32 represent time. The vertical axis of the graph g31 indicates the packet flow rate (Mbps) and the vertical axis of the graph g32 indicates the abnormality level. Further, a waveform k31 is the learned data of the traffic model, a waveform k32 is the predicted value of the traffic, a waveform k33 is the actual measurement value of the traffic, and a waveform k34 is the abnormality level.

[Operation S41] During the learning period of the traffic, the traffic learning unit 13 selects the AR model as the time-series model based on the traffic information accumulated by the statistical information holding unit 12 and generates the traffic model by the AR of the waveform k31.

[Operation S42] During the predicted period of the traffic, the traffic predicting unit 14 obtains the traffic predicted value (waveform k32) from the traffic model based on the AR generated by the traffic learning unit 13.

[Operation S43] The abnormality level calculating unit 15 calculates the abnormality level of the traffic by Equation (1) or (2) based on the predicted value (waveform k32) of the traffic and the actual measurement value (waveform k33) of the traffic accumulated by the statistical information holding unit 12 during the predicted period.

[Operation S44] The abnormality level determining unit 16 compares the calculated abnormality level with the threshold value and determines that there is an abnormality when the abnormality level exceeds the threshold value. In the example of FIG. 9, since the calculated abnormality level exceeds a predetermined threshold value (for example, 20), it is determined that there is an abnormality.

In the case where the traffic having the constant cycle is small with respect to the traffic including the cycle component and the trend component, in the example of FIG. 9, it is determined that the traffic having the constant cycle is continuously abnormal.

Figure 10:
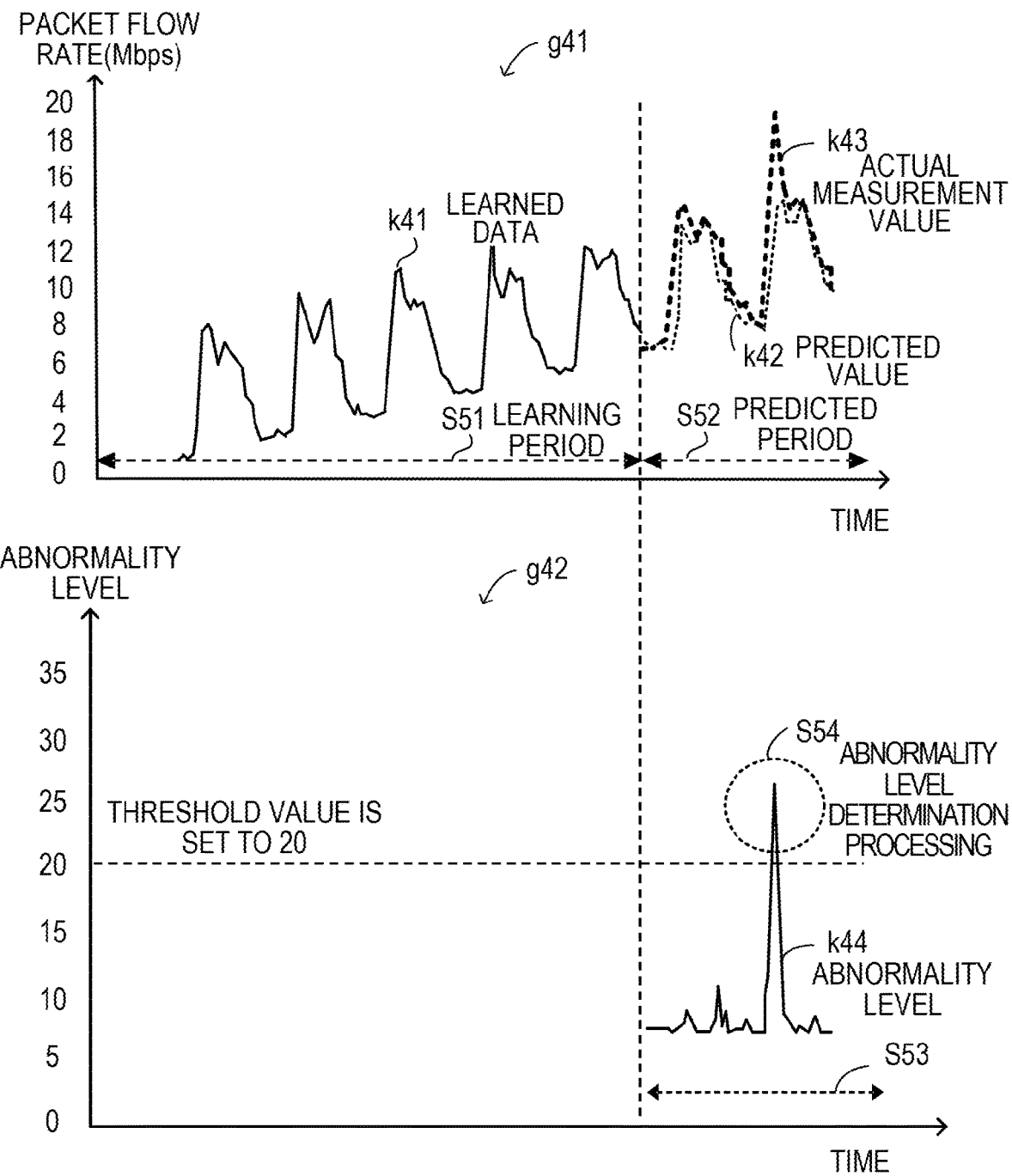
FIG. 10 is a diagram illustrating an example of an abnormality level determination in a case where a large amount of traffic temporarily occurs for the traffic including the cyclic component and the trend component.

Next, as the determination example of the abnormality level, a case where a large amount of traffic as the traffic including the cycle component and the trend component temporarily occurs will be described. FIG. 10 is a diagram illustrating an example of an abnormality level determination in a case where a large amount of traffic temporarily occurs for the traffic including the cyclic component and the trend component.

The horizontal axes of graphs g41 and g42 are the time. The vertical axis of the graph g41 indicates the packet flow rate (Mbps) and the vertical axis of the graph g42 indicates the abnormality level. Further, a waveform k41 is the learned data of the traffic model, a waveform k42 is the predicted value of the traffic, a waveform k43 is the actual measurement value of the traffic, and a waveform k44 is the abnormality level.

[Operation S51] During the learning period of the traffic, the traffic learning unit 13 selects the ARIMA model as the time-series model based on the traffic information accumulated by the statistical information holding unit 12 and generates the traffic model by the ARIMA of the waveform k41.

[Operation S52] During the predicted period of the traffic, the traffic predicting unit 14 obtains the traffic predicted value (waveform k42) from the traffic model based on the ARIMA generated by the traffic learning unit 13.

[Operation S53] The abnormality level calculating unit 15 calculates the abnormality level by Equation (1) or (2) based on the predicted value (waveform k42) of the traffic and the actual measurement value (waveform k43) of the traffic accumulated by the statistical information holding unit 12 during the predicted period.

[Operation S54] The abnormality level determining unit 16 compares the calculated abnormality level with the threshold value and determines that there is an abnormality when the abnormality level exceeds the threshold value. In the example of FIG. 10, since the calculated abnormality level exceeds a predetermined threshold value (for example, 20), it is determined that there is an abnormality.

In the case where a large amount of traffic temporarily occurs as the traffic including the cycle component and the trend component, it is determined that there is an abnormality in the example of FIG. 10.

Operation of Traffic Learning Unit

Figure 11:
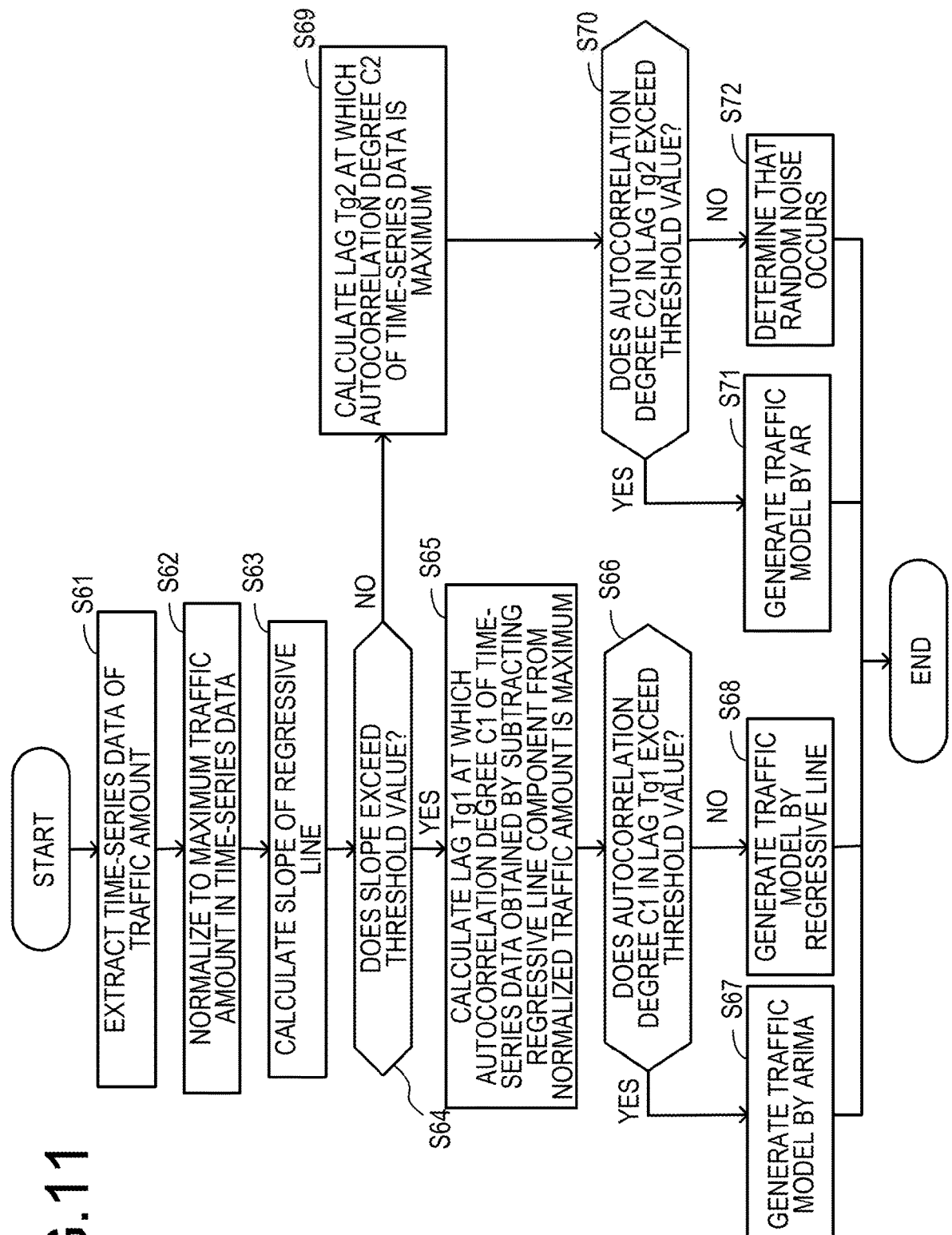
FIG. 11 is a flowchart illustrating an operation of a traffic learning unit.

Next, the operation of the traffic learning unit 13 will be described with reference to FIGS. 11 to 13. FIG. 11 is a flowchart illustrating an operation of a traffic learning unit.

[Operation S61] The traffic learning unit 13 extracts time-series data of a traffic amount during a predetermined period from the traffic information accumulated by the statistical information holding unit 12.

[Operation S62] The traffic learning unit 13 performs a normalization with a maximum traffic amount in the time-series data. Further, since the traffic amount varies according to the bandwidth of a line, a normalization is performed in order to handle the traffic amount in a unified manner.

[Operation S63] The traffic learning unit 13 calculates a slope of a regressive line of the normalized traffic amount.

[Operation S64] The traffic learning unit 13 determines whether the slope of the regressive line exceeds the threshold value. When it is determined that the slope of the regressive line exceeds the threshold value, the processing proceeds to operation S65, and when it is determined that the slope of the regressive line does not exceed the threshold value, the processing proceeds to operation S69. Further, by the processing of operation S64, when it is determined that the slope of the regressive line is equal to or less than the threshold value, the trend component may be ignored, and thus, conformity to the AR model is determined after operation S69.

[Operation S65] The traffic learning unit 13 calculates a lag Tg1 at which an autocorrelation degree C.1 of the time-series data obtained by subtracting a regressive line component from the normalized traffic amount is maximum.

Further, the lag represents a deviation amount of the time axis with respect to original time-series data.

[Operation S66] The traffic learning unit 13 determines whether the autocorrelation degree C.1 in the lag Tg1 exceeds a threshold value. When it is determined that the autocorrelation degree C.1 exceeds the threshold value, the processing proceeds to operation S67, and when it is determined that the autocorrelation degree C.1 does not exceed the threshold value, the processing proceeds to operation S68.

In the process of operation S66, a determination of whether there is a periodicity is performed by the autocorrelation degree C.1, and when the autocorrelation degree C.1 exceeds the threshold value (when there is the periodicity), the traffic model by the ARIMA is generated. [Operation S67] The traffic learning unit 13 generates the traffic model by the ARIMA. Further, the ARIMA model has parameters of an autoregressive order p, an order q of a difference, and an order r of a moving average. The traffic learning unit 13 sets a value of the parameter such that a measure indicating a fitness degree of the model such as, for example, the Akaike's Information Criterion (AIC) is minimized.

[Operation S68] The traffic learning unit 13 generates the traffic model by the regressive line.

[Operation S69] The traffic learning unit 13 calculates a lag Tg2 at which an autocorrelation degree C.2 of the time-series data is maximum.

[Operation S70] The traffic learning unit 13 determines whether the autocorrelation degree C.2 in the lag Tg2 exceeds a threshold value. When it is determined that the autocorrelation degree C.2 exceeds the threshold value, the processing proceeds to operation S71, and when it is determined that the autocorrelation degree C.2 does not exceed the threshold value, the processing proceeds to operation S72.

In the process of operation S70, whether there is a periodicity or not is determined by the autocorrelation degree C.2, and when the autocorrelation degree C.2 exceeds the threshold value (when there is a periodicity), the traffic model by the AR is generated.

[Operation S71] The traffic learning unit 13 generates the traffic model by the AR. In this case, the traffic learning unit 13 selects, for example, the order p of auto-regression which minimizes the AIC.

[Operation S72] The traffic learning unit 13 makes the modeling impossible, and determines that a random noise occurs.

FIGS. 12 and 13 are diagrams for describing the operation of the traffic learning unit by a specific example. The processing related to operations S61 to S67 of the flowchart illustrated in FIG. 11 is illustrated by the specific example. The horizontal axes of graphs g51, g52, g53, and g55 represent time and the horizontal axis of a graph g54 represents the lag. The vertical axes of the graphs g51 and g55 represent the packet flow rate, the vertical axes of the graphs g52 and g53 represent normalization degrees, and the vertical axis of the graph g54 represents the autocorrelation degree.

[Graph g51] The traffic learning unit 13 extracts time-series data ts1 of the traffic during a predetermined period from the traffic information accumulated by the statistical information holding unit 12.

[Graph g52] The traffic learning unit 13 performs a normalization with the maximum traffic amount in the time-series data ts1 and calculates the slope R1 of the regressive line.

[Graph g53] When the slope R1 of the regressive line exceeds a threshold value, the traffic learning unit 13 generates time-series data ts2 obtained by subtracting a regressive line component from the normalized traffic amount.

[Graph g54] The traffic learning unit 13 detects the lag Tg1 at which the autocorrelation degree C.1 of the time-series data ts2 becomes maximum, and compares and determines the autocorrelation degree C.1 with the threshold value. In the figure, at the lag Tg1=24, it is determined that the autocorrelation degree C.1 exceeds the threshold value.

[Graph g55] Since the autocorrelation degree C.1 exceeds the threshold value, the traffic learning unit 13 generates a traffic model m1*a* by the ARIMA.

Update of Traffic Model

Next, a traffic model update control will be described with reference to FIGS. 14 to 16. In the traffic model update control, abnormal data of a traffic model determined to be abnormal in the abnormality level determining unit 16 is notified to the traffic learning unit 13. In addition, the traffic learning unit 13 updates the traffic model (updates the traffic learning) based on the learned data in which the abnormal data is removed from the actual measurement data.

Figure 14:
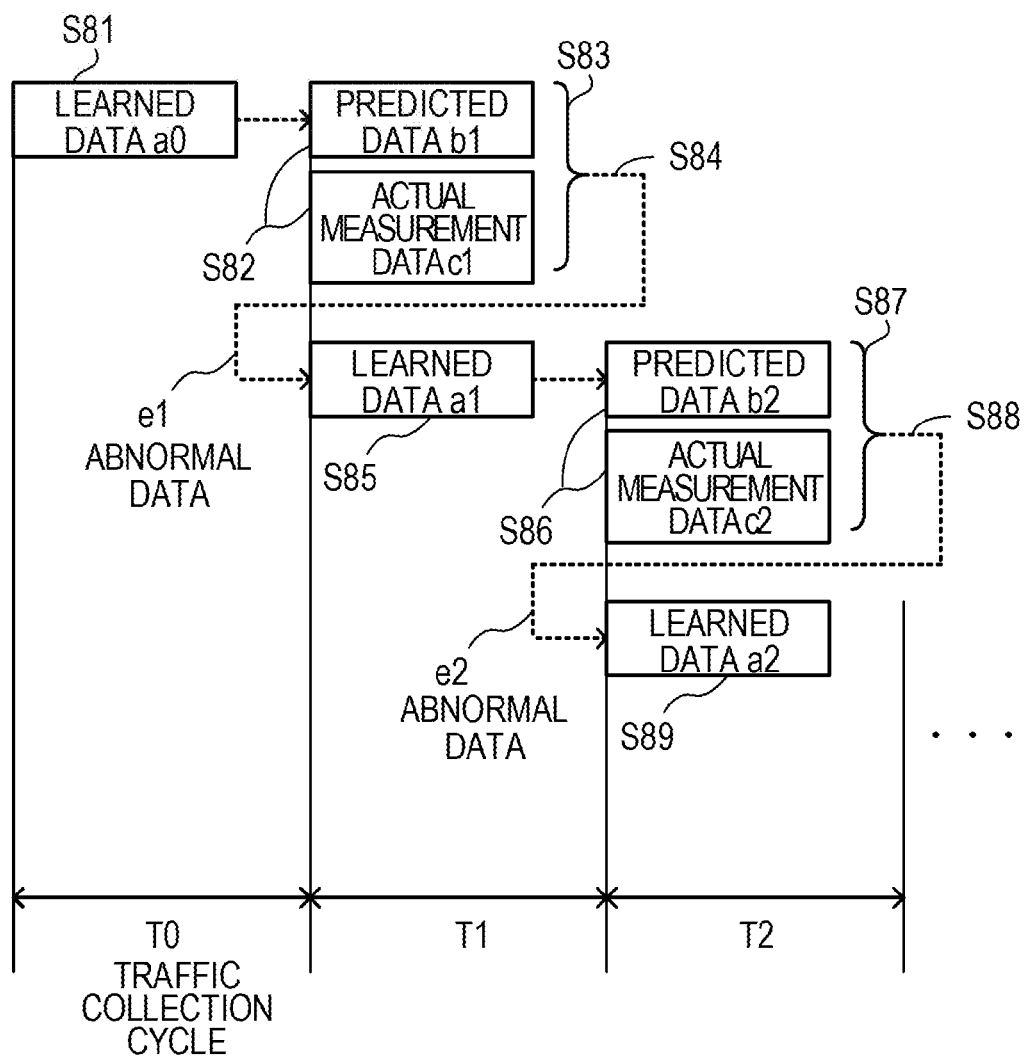
FIG. 14 is a diagram illustrating an example of an operation sequence of traffic model update control.

FIG. 14 is a diagram illustrating an example of an operation sequence of traffic model update control.

[Operation S81] In a traffic collection cycle T0, the traffic learning unit 13 acquires the traffic information from the statistical information holding unit 12 and generates learned data a0 (traffic model).

[Operation S82] In a traffic collection cycle T1, the traffic predicting unit 14 obtains the predicted data b1 of the traffic based on the learned data a0. Further, the abnormality level calculating unit 15 acquires the traffic information (actual measurement data c1) from the statistical information holding unit 12.

[Operation S83] In the traffic collection period T1, the abnormality level calculating unit 15 calculates the abnormality level based on the predicted data b1 and the actual measurement data c1, and the abnormality level determining unit 16 performs an abnormality level determination processing.

[Operation S84] In the traffic collection period T1, the abnormality level determining unit 16 performs the abnormality level determination processing and notifies the abnormal data e1 determined to be abnormal to the traffic learning unit 13.

[Operation S85] In the traffic collection period T1, the traffic learning unit 13 generates the learned data a1 (traffic model) based on data in which the abnormal data e1 is removed from the actual measurement data c1.

[Operation S86] In a traffic collection period T2, the traffic predicting unit 14 obtains predicted data b2 of the traffic based on learned data a1. Further, the abnormality level calculating unit 15 acquires traffic information (actual measurement data c2) from the statistical information holding unit 12.

[Operation S87] In the traffic collection period T2, the abnormality level calculating unit 15 calculates the abnormality level based on the predicted data b2 and the actual measurement data c2, and the abnormality level determining unit 16 performs the abnormality level determination processing.

[Operation S88] In the traffic collection period T2, the abnormality level determining unit 16 performs the abnormality level determination processing and notifies to the traffic learning unit 13 abnormal data e2 determined to be abnormal.

[Operation S89] In the traffic collection period T2, the traffic learning unit 13 generates the learned data a2 (traffic model) based on data in which the abnormal data e2 is removed from the actual measurement data c2.

When the traffic learning unit 13 removes the abnormal data from the actual measurement data to generate the traffic model, the traffic learning unit 13 interpolates a missing value on the traffic model generated by removing the abnormal data into an approximate curve using normal data positioned around the abnormal data. As a result, it is possible to efficiently generate the traffic model by updating.

FIGS. 15, 16, and 17 are diagrams for describing an example in which the abnormality level detection accuracy is enhanced by the traffic model update control. In FIG. 15, graphs g61 and g62 illustrate a state when the abnormality level determination processing is performed in a cycle Tn. The horizontal axes of the graphs g61 and g62 indicate the time, the vertical axis of the graph g61 indicates the packet flow rate (Mbps), and the vertical axis of the graph g62 indicates the abnormality level. The abnormality level calculating unit 15 calculates the abnormality level based on the predicted value and the actual measurement value of the graph g61, and the abnormality level determining unit 16 determines that there is an abnormality because the abnormality level exceeds the threshold value.

In FIG. 16, graphs g63 and g64 illustrate the state when the abnormality level determination processing is performed in a case where prediction is made with the ARIMA model including an abnormality value in a next cycle T(n+1). The horizontal axes of the graphs g63 and g64 indicate the time, the vertical axis of the graph g63 indicates the packet flow rate (Mbps), and the vertical axis of the graph g64 indicates the abnormality level.

As illustrated in the graph g63, the predicted value is dragged by the abnormality value and a steep peak waveform thus appears. For this reason, as illustrated in the graph g64, since a deviation between the predicted value and the actual measurement value becomes large, the abnormality level determining unit 16 erroneously determines that the state which is originally normal is abnormal.

In FIG. 17, graphs g65 and g66 illustrate the state when the abnormality level determination processing is performed in a case where prediction is made with the ARIMA model by removing an abnormality value in the next cycle T(n+1). The horizontal axes of the graphs g65 and g66 indicate the time, the vertical axis of the graph g65 indicates the packet flow rate (Mbps), and the vertical axis of the graph g66 indicates the abnormality level.

As illustrated in the graph g65, the predicted value is not dragged by the abnormality value and the deviation between the predicted value and the actual measurement value is small. For this reason, as indicated in the graph g66, since the deviation between the predicted value and the actual measurement value becomes small, the abnormality level determining unit 16 correctly determines that there is no abnormality.

As described above, when learning the traffic model including the abnormal data, the accuracy of the predicted data may decrease. Therefore, the traffic learning unit 13 removes the abnormal data of the traffic model determined to be abnormal in the abnormality level determining unit 16 from the actual measurement data and updates the traffic model based on the learned data not including the abnormal data. As a result, the accuracy of the predicted data (predicted value) may be enhanced.

In the above description, the traffic learning unit 13 updates the traffic model based on the data in which the abnormal data determined to be abnormal is removed from the actual measurement value. In this regard, the traffic learning unit 13 may also remove the data of a cycle in which the abnormal data occurs, including even the normal data, and update the traffic model based on the data of the cycle immediately before the cycle.

Advance Reception of Traffic Demand

Figure 18:
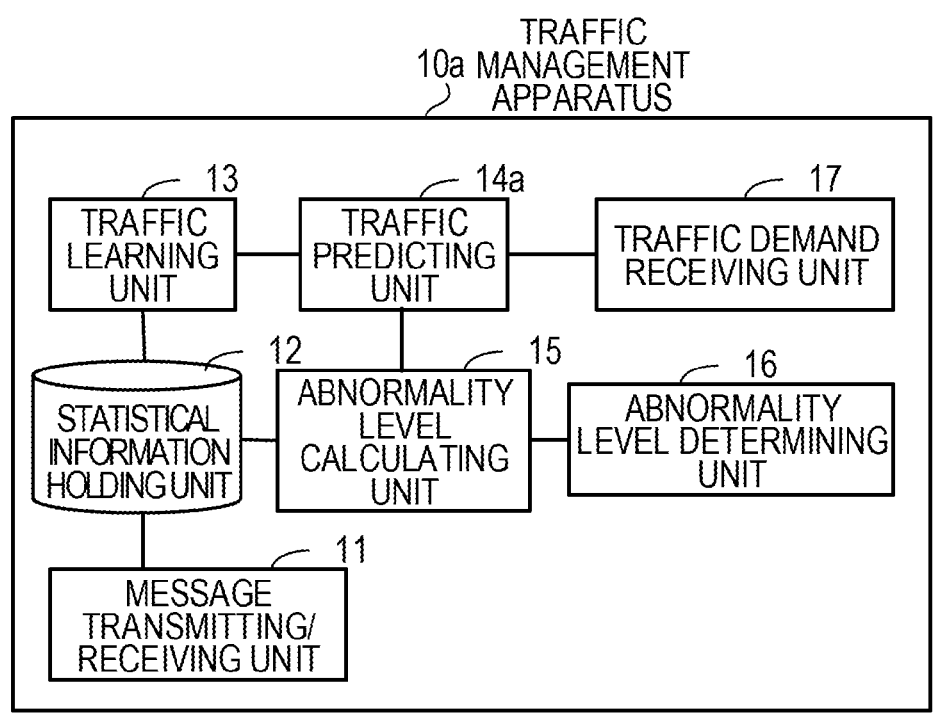
FIG. 18 is a diagram illustrating an example of a configuration of a traffic management apparatus.

Next, a case in which a traffic demand (traffic demand amount) is received in advance and abnormality level determination is performed will be described with reference to FIGS. 18 and 19. FIG. 18 is a diagram illustrating an example of a configuration of a traffic management apparatus. A traffic management apparatus 10a includes the message transmitting/receiving unit 11, the statistical information holding unit 12, the traffic learning unit 13, a traffic predicting unit 14a, the abnormality level calculating unit 15, the abnormality level determining unit 16, and a traffic demand receiving unit 17.

The traffic demand receiving unit 17 preliminarily registers a scheduled traffic demand input from a network operator. The traffic predicting unit 14a sets the sum of the predicted value obtained from a past traffic trend and the traffic amount registered in the traffic demand receiving unit 17 as the predicted value. Further, other components are the same as those in FIG. 5.

Figure 19:
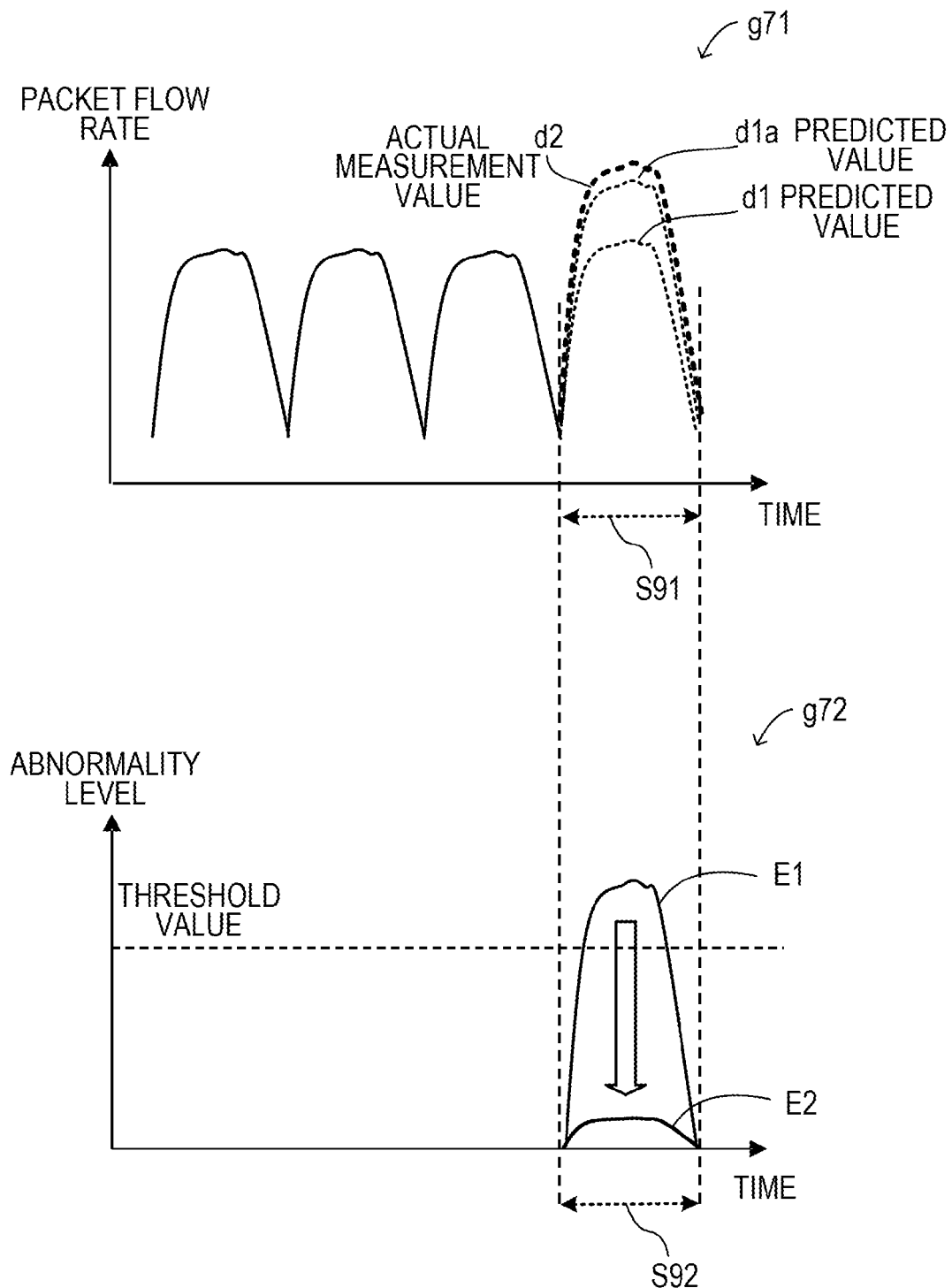
FIG. 19 is a diagram illustrating an example of an operation of performing an abnormality level determination by receiving a traffic demand in advance.

FIG. 19 is a diagram illustrating an example of an operation of performing an abnormality level determination by receiving a traffic demand in advance. The horizontal axes of graphs g71 and g72 indicate the time, the vertical axis of the graph g71 indicates the packet flow rate (Mbps), and the vertical axis of the graph g72 indicates the abnormality level.

[Operation S91] The traffic predicting unit 14a obtains a predicted value d1a by superimposing the traffic amount registered in the traffic demand receiving unit 17 on a predicted value d1 obtained from the past traffic trend.

[Operation S92] The abnormality level calculating unit 15 calculates the abnormality level based on an actual measurement value d2 and the predicted value d1a including the traffic demand, and the abnormality level determining unit 16 compares the abnormality level with the threshold value and performs the abnormality level determination processing.

When the abnormality level determination is performed without receiving the traffic demand, there is a possibility that the abnormality level becomes an abnormality level E1 and exceeds the threshold value. However, since a case where the traffic amount temporarily increases due to, for example, a software update, is not abnormal traffic, an erroneous determination may be made.

Meanwhile, when the abnormality level determination is performed by receiving the traffic demand in advance, the abnormality level becomes an abnormality level E2 and falls below the threshold value. Therefore, in a case where the traffic amount temporarily increases due to, for example, the software update, the abnormality level may be determined correctly so as not to regard the temporarily increased traffic as the abnormal traffic.

As described above, by receiving the traffic demand in advance and performing the abnormality level determination, the traffic management apparatus 10a may be able to correctly determine the traffic fluctuation which occurs in a normal communication state so as not to be regarded as the abnormal traffic.

As described above, according to the present disclosure, it is possible to enhance the detection accuracy of the traffic abnormality level. As a result, for example, even the fluctuating traffic that is determined to be abnormal in a fixed threshold base is determined to be normal when the fluctuation is expected from the past traffic trend, and the network operator may reduce a work burden for responding to an erroneous determination.

Even when there is no abnormality in the traffic amount, a network fault may be detected in an early stage in the traffic with a fast fluctuation cycle. As a result, an overlooking of the abnormal traffic is eliminated and it becomes possible to prevent an expansion of a fault scale.

The processing functions of the traffic management apparatuses 1 and 10 of the present disclosure described above may be implemented by a computer. In this case, a program describing the processing contents of the functions that the traffic management apparatuses 1 and 10 need to have is provided. By executing the program by the computer, the processing function is implemented on the computer.

The program that describes the processing contents may be recorded in a computer-readable recording medium. The computer-readable recording medium includes, for example, a magnetic memory device, an optical disk, a magneto-optical recording medium, and a semiconductor memory. The magnetic memory device includes, for example, a hard disk device (HDD), a flexible disk (FD), and a magnetic tape. The optical disk includes, for example, a DVD, a DVD-RAM, and a CD-ROM/RW. The magneto-optical recording medium includes, for example, a magneto optical disk (MO).

When distributing a program, for example, a portable recording medium such as the DVD or the CD-ROM in which the program is recorded is sold. Further, the program may be stored in a memory device of a server computer and the program may be transferred from the server computer to another computer via a network.

The computer that executes the program stores, for example, the program recorded in the portable recording medium or the program transferred from the server computer in the memory device thereof. In addition, the computer reads the program from the memory device thereof and executes the processing according to the program. Further, the computer may read the program directly from the portable recording medium and execute the processing according to the program.

Each time the program is transferred from a server computer connected via the network, the computer may sequentially execute the processing according to the received program. Further, at least a part of the above processing functions may be implemented by electronic circuits such as a DSP, an ASIC or a PLD.

Although the embodiments are exemplified above, the configuration of each part described in the embodiments may be replaced with another component having the same function. Further, any other components or steps may be added. In addition, any two or more configurations (features) of the above-described embodiments may be combined with each other.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A traffic management apparatus comprising:
   a memory; and
   a processor coupled to the memory and the processor configured to:
   select a base model based on history information stored in the memory so as to generate a traffic model;
   obtain a predicted value of traffic according to the traffic model; and
   detect traffic abnormality based on the predicted value and an actual measurement value of the traffic,
   wherein when an abnormality value is detected by detecting the traffic abnormality, based on a first traffic model generated in a first cycle, the processor is configured to remove the abnormality value from first history information acquired in a second cycle subsequent to the first cycle.

2. The traffic management apparatus according to claim 1, wherein the processor is further configured to select as the base model one of an auto regressive model, an autoregressive sum moving average model, and a regressive line model, based on a slope of a regressive line of a traffic amount during a predetermined period of the history information.

3. The traffic management apparatus according to claim 1, wherein the processor is further configured to:
   generate a second traffic model in the second cycle, based on second history information in which the abnormality value is removed; and
   obtain the predicted value from the second traffic model.

4. The traffic management apparatus according to claim 3, wherein when the second traffic model is detected, the processor is further configured to interpolate a missing value generated by removing the abnormality value into an approximate curve using a normality value positioned around the abnormality value.

5. The traffic management apparatus according to claim 1, wherein the processor is further configured to acquire a traffic demand amount scheduled in advance to obtain the predicted value including the traffic demand amount.

6. A traffic management method comprising:
   selecting, by a processor, a base model based on history information so as to generate a traffic model;
   obtaining, by the processor, a predicted value of traffic according to the traffic model; and
   detecting, by the processor, traffic abnormality based on the predicted value and an actual measurement value of the traffic,
   wherein when an abnormality value is detected by detecting the traffic abnormality, based on a first traffic model generated in a first cycle, the abnormality value is removed from first history information acquired in a second cycle subsequent to the first cycle by the processor.

7. A computer-readable non-transitory medium storing a program that causes a computer to execute a procedure, the procedure comprising:
   selecting a base model based on history information so as to generate a traffic model;

obtaining a predicted value of traffic according to the traffic model; and detecting traffic abnormality based on the predicted value and an actual measurement value of the traffic, wherein when an abnormality value is detected by detecting the traffic abnormality, based on a first traffic model generated in a first cycle, the abnormality value is removed from first history information acquired in a second cycle subsequent to the first cycle.

* * * * *